US006818032B2

(12) United States Patent
Bilek et al.

(10) Patent No.: US 6,818,032 B2
(45) Date of Patent: Nov. 16, 2004

(54) DIRT COLLECTING SYSTEM FOR A VACUUM CLEANER

(76) Inventors: Greg A. Bilek, 11409 Clinton Rd., Doylestown, OH (US) 44230; Steven W. Blate, 1351 Lorell SW., North Canton, OH (US) 44720; Nick M. Bosyj, 2297 Rohrer St. NW., North Canton, OH (US) 44720; Donald A. Coates, 5045 Hollyhock Ave. NW., Canton, OH (US) 44718; Arne J. Diehl, 604 Lorena St. SW., North Canton, OH (US) 44720; Kurt D. Harsh, 5729 Glyn Dr. NW., North Canton, OH (US) 44720; Raymond L. Lawter, 309 Wooster Rd., Millersburg, OH (US) 44654; Jackson W. Wegelin, 682 Allyn St., Akron, OH (US) 44311

( * ) Notice: Subject to any disclaimer, the term of this patent is extended or adjusted under 35 U.S.C. 154(b) by 0 days.

(21) Appl. No.: 10/176,806

(22) Filed: Jun. 21, 2002

(65) Prior Publication Data

US 2002/0166310 A1 Nov. 14, 2002

Related U.S. Application Data

(63) Continuation of application No. 09/519,106, filed on Mar. 6, 2000, now Pat. No. 6,596,044.

(51) Int. Cl.⁷ .............................................. B01D 50/00
(52) U.S. Cl. .......................... 55/337; 55/459.1; 55/472; 55/482; 55/DIG. 3; 15/327.1; 15/327.7; 15/352; 15/353
(58) Field of Search ................................ 55/337, 459.1, 55/472, 482, DIG. 3, 334, 335, 368; 15/327.1, 327.7, 352, 353, 348; 209/23, 25, 143, 250

(56) References Cited

U.S. PATENT DOCUMENTS

| | | | | | |
|---|---|---|---|---|---|
| 3,320,727 | A | * | 5/1967 | Farley et al. | .................. 15/353 |
| 4,724,574 | A | * | 2/1988 | Bowerman et al. | ....... 55/DIG. 3 |
| 4,878,930 | A | * | 11/1989 | Manniso et al. | ............... 55/498 |
| 5,735,403 | A | * | 4/1998 | Stiglianese | ................. 55/459.1 |
| 6,146,434 | A | * | 11/2000 | Scalfani et al. | ........... 55/DIG. 3 |
| 6,195,835 | B1 | * | 3/2001 | Song et al. | .............. 55/DIG. 3 |
| 6,301,744 | B1 | * | 10/2001 | Embree et al. | ........... 55/DIG. 3 |
| 6,391,095 | B1 | * | 5/2002 | Conrad et al. | ........... 55/DIG. 3 |
| 6,432,154 | B2 | * | 8/2002 | Oh et al. | ................. 55/DIG. 3 |
| 6,436,160 | B1 | * | 8/2002 | Stephens et al. | ......... 55/DIG. 3 |

* cited by examiner

*Primary Examiner*—Minh-Chau T. Pham

(57) ABSTRACT

A dirt collecting system for a vacuum cleaner includes a dirt cup formed with a first dirt collecting chamber and a second dirt collecting chamber separated by an apertured wall. An inlet opening is formed in the dirt cup and communicates with the first dirt collecting chamber for inputting a stream of dirt laden air into the first dirt collecting chamber. An exhaust opening is formed in the second dirt collecting chamber for allowing the filtered air stream to exit the dirt cup. The aperture wall includes a pre-filter for filtering coarse particles from a stream of dirt laden and depositing the coarse particles in the first dirt collecting chamber. A filter member is positioned within the second dirt collecting chamber and communicates with the exhaust port. The filter element filters fine particles from the air stream and deposits the fine particles within the second dirt collecting chamber. The filter member is supported by a filter support which extends from the aperture wall to vertically support the filter member within the second dirt collecting chamber. The aperture wall, filter support and filter member are removably mounted within the dirt cup to provide for removal and cleaning thereof. A lid removalby mounts on the dirt cup and encloses the first and second dirt collecting chamber and is held thereon by a latching mechansim.

20 Claims, 27 Drawing Sheets

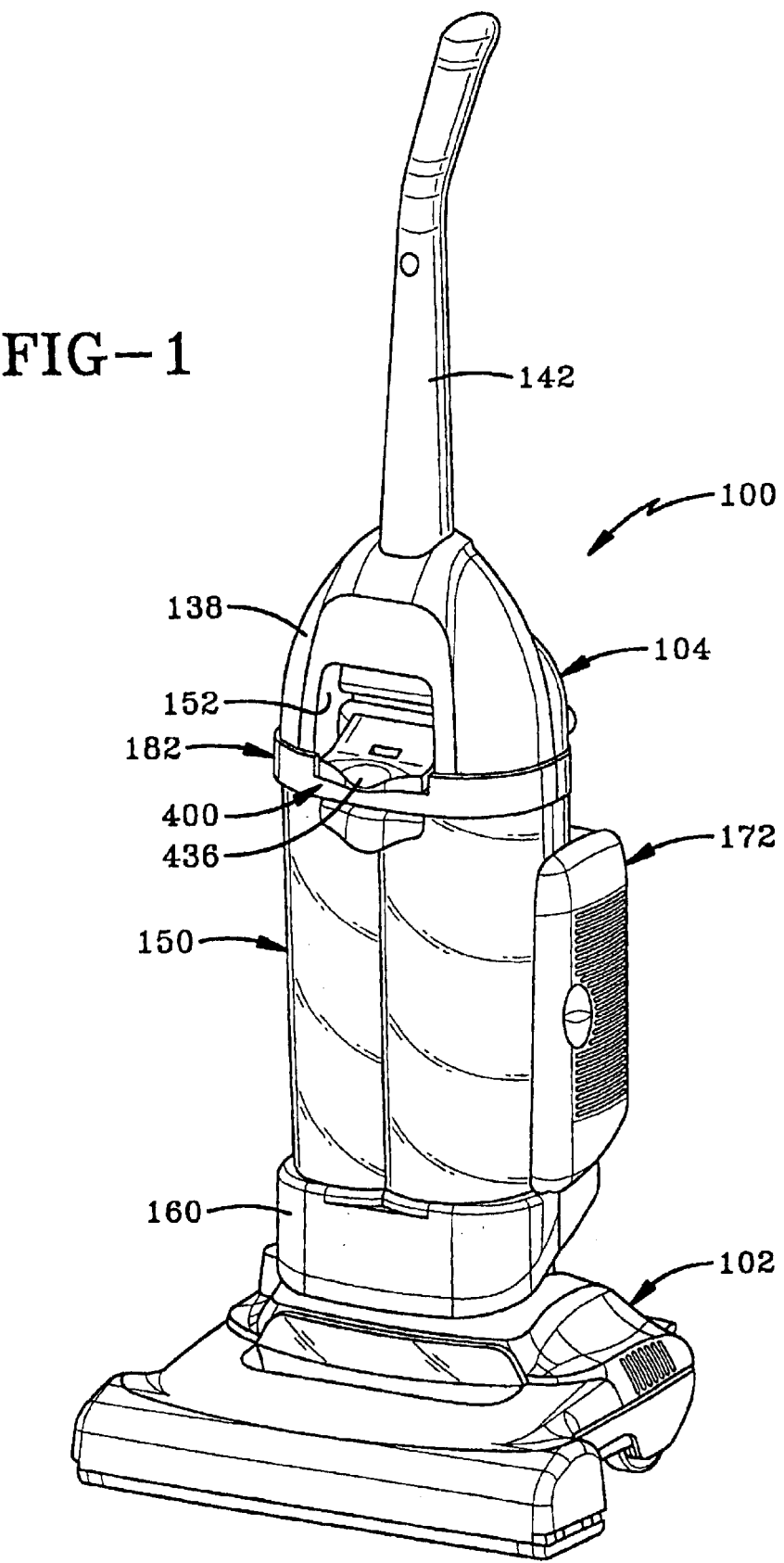

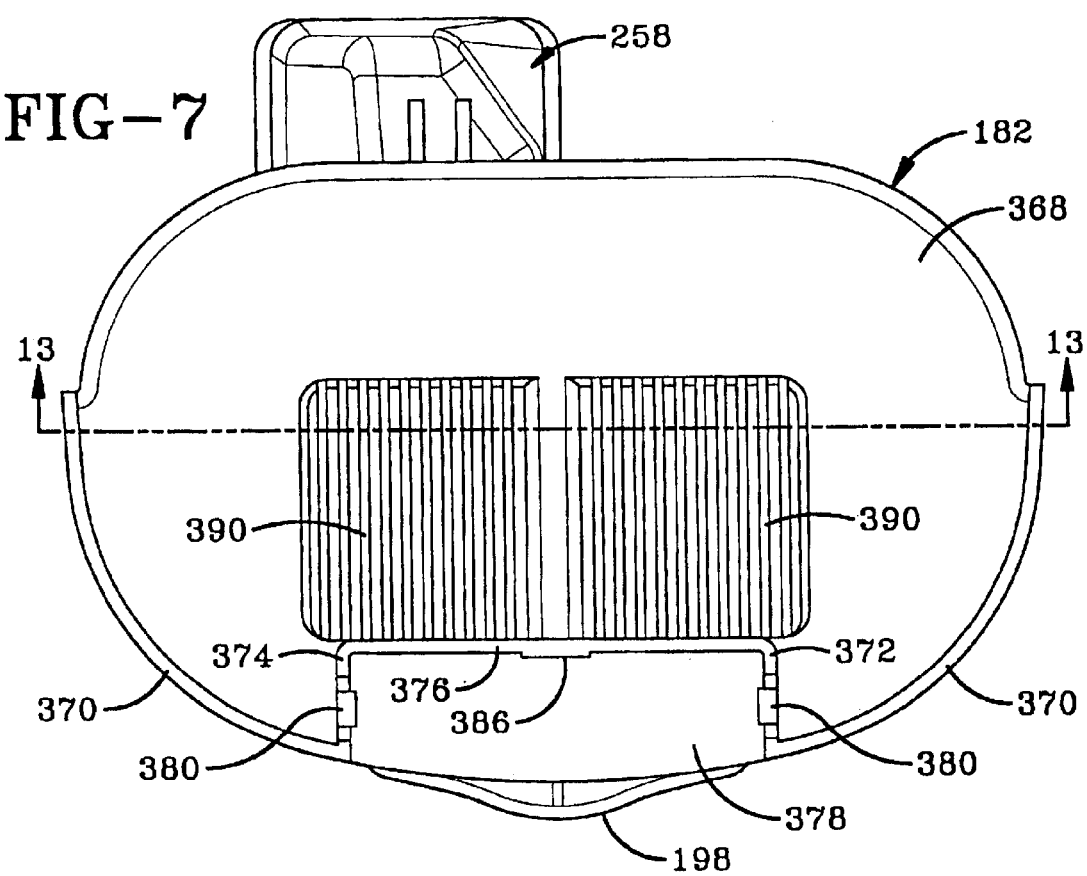
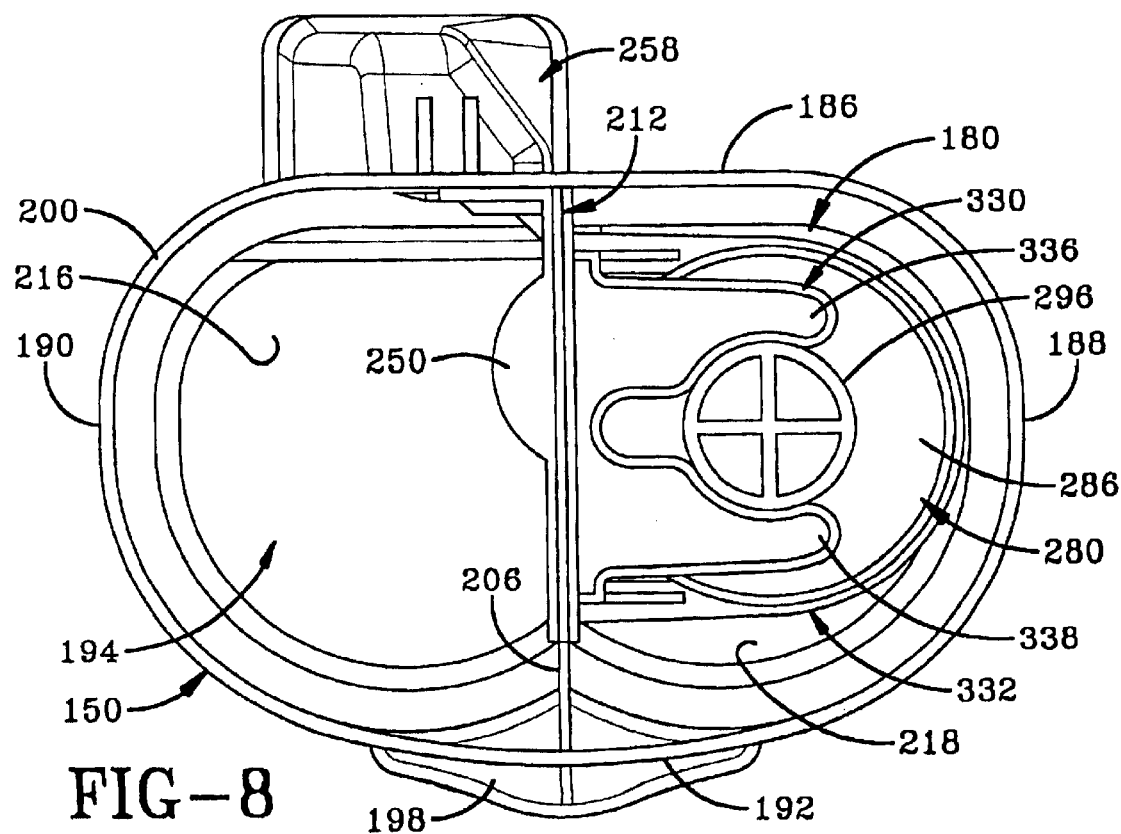

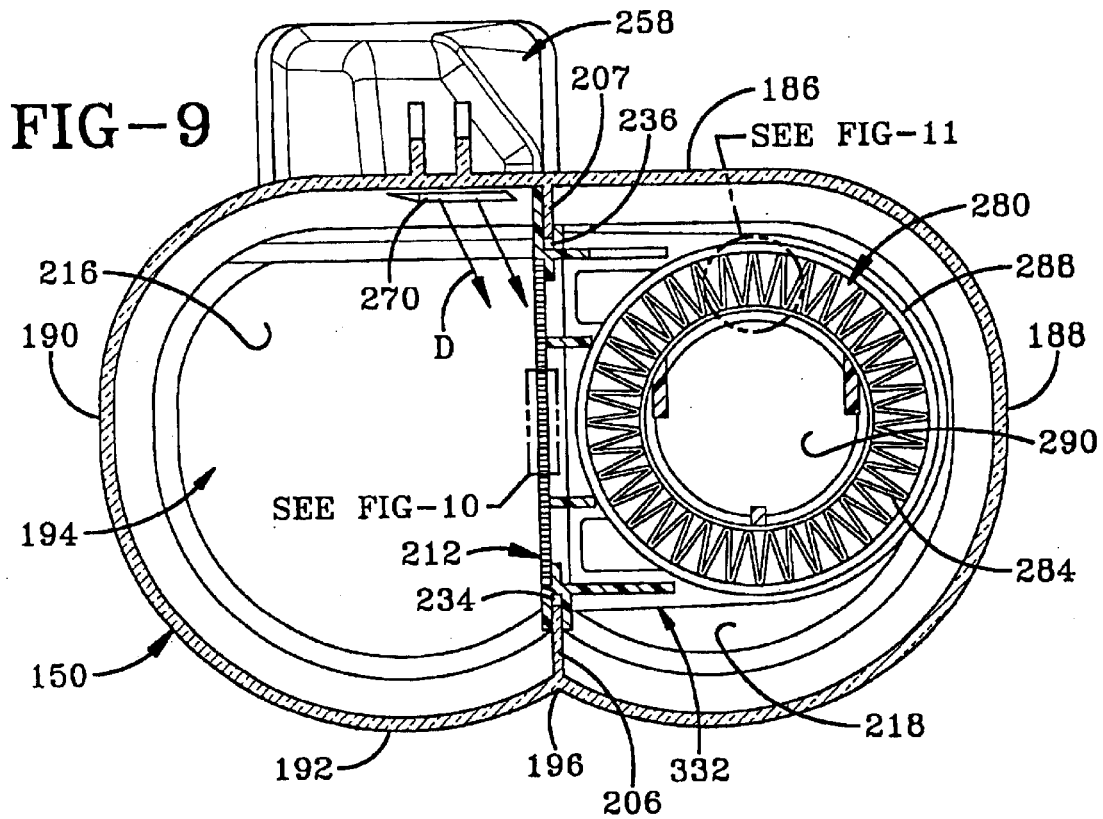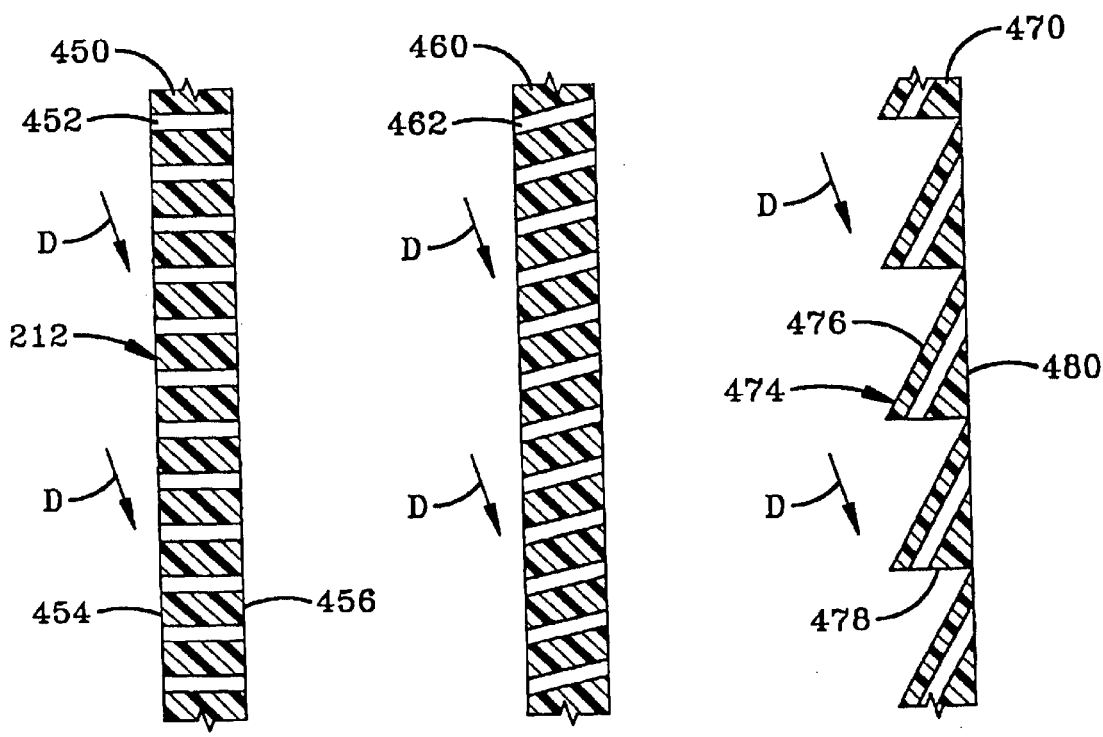

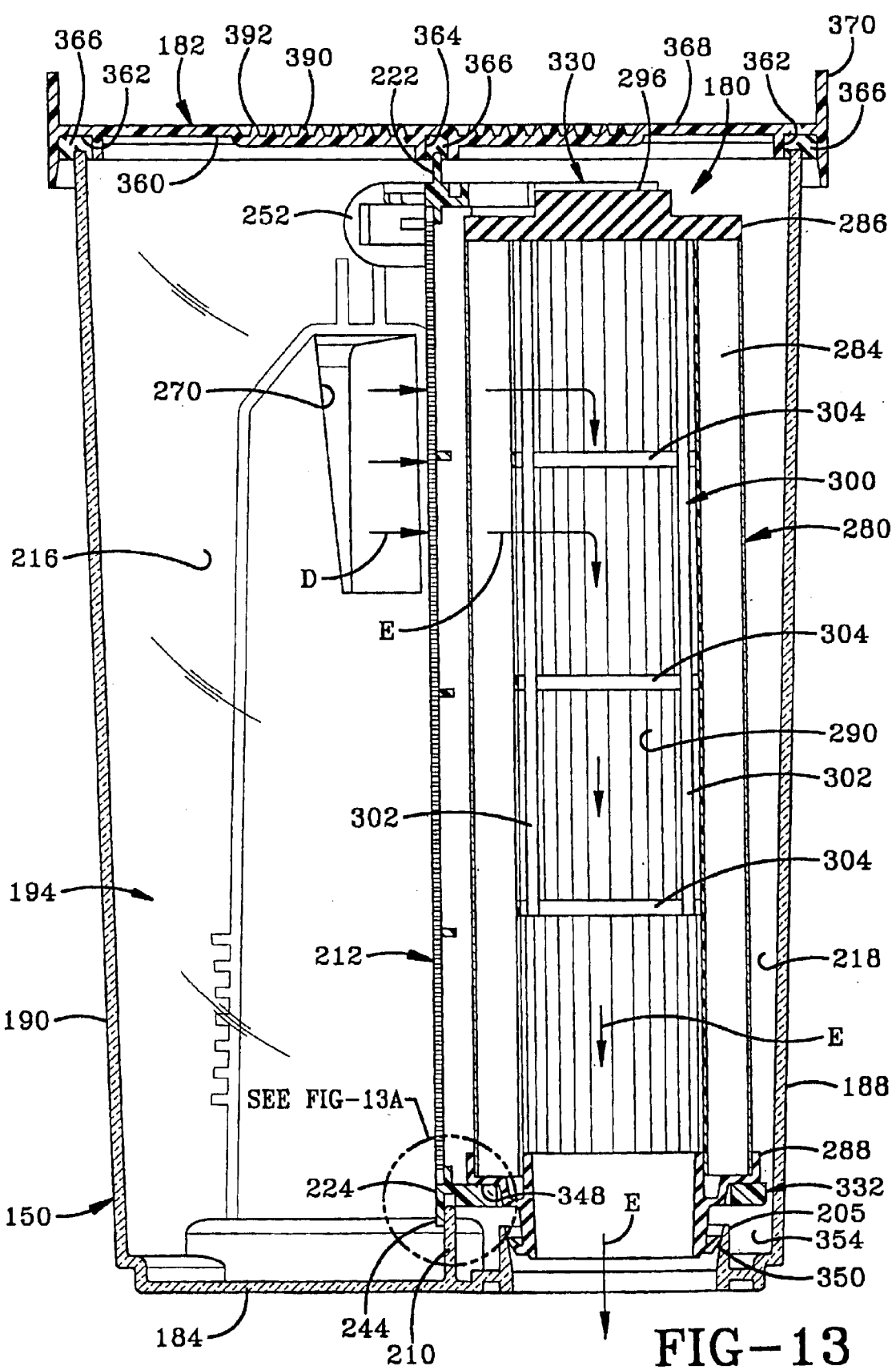

DIRT COLLECTING SYSTEM FOR A VACUUM CLEANER

"This application is a continuation of U.S. patent application Ser. No. 09/519,106 filed on Mar. 6, 2000, now U.S. Pat. No. 6,596,044.

BACKGROUND OF THE INVENTION

1. Technical Field

Generally, the invention relates to vacuum cleaners. Particularly, the invention relates to a dirt collecting system for a vacuum cleaner. Even more particularly, the invention relates to a dirt collecting system for use in a bagless vacuum cleaner.

2. Background Information

Upright vacuum cleaners are well known in the art. Typically, these upright vacuum cleaners include a vacuum cleaner housing pivotally mounted to a vacuum cleaner foot. The foot is formed with a nozzle opening and may include an agitator mounted therein for loosening dirt and debris from a floor surface. A motor may be mounted to either the foot or the housing for producing suction at the nozzle opening. The suction at the nozzle opening picks up the loosened dirt and debris and produces a stream of dirt-laden air which is ducted to the vacuum cleaner housing.

In conventional vacuum cleaners, the dirt laden air is ducted into a vacuum cleaner filter bag supported on or within the vacuum cleaner housing. However, bagless vacuum cleaners have recently become prevalent in the marketplace. These bagless vacuum cleaners duct the stream of dirt-laden air into a dirt cup having a dirt collecting system which filters the dirt particles from the air stream before exhausting the filtered air stream into the atmosphere. Various dirt collecting systems have been used on these bagless vacuum cleaners to separate the dirt particles from the air stream. For example, U.S. Pat. No. 946,535 discloses a receptacle having a filter element upstream of an exhaust opening of the receptacle. The dirt particles are separated from the air stream by the filter element before the air stream exits the receptacle. U.S. Pat. No. 2,768,707 discloses a cyclonic separator which uses a tangential input in combination with a cone of decreasing top to bottom cross sectional dimension. As the air stream enters the cone in a tangential direction, the dirt particles are released from the air stream due to centrifugal force and gravity. Other known bagless vacuum cleaners include a dirt cup having a single cylindrical filter element positioned therein whereby the air is input tangentially into the dirt cup to create a cyclonic action within the dirt cup chamber. This cyclonic action causes the larger dirt particles contained in cyclonic air stream to fall therefrom due to the centrifugal force and gravity. The smaller dirt particles are then separated by the filter element as the air stream flows through the filter element and is exhausted from the dirt cup.

Although these bagless vacuum cleaners are adequate for the purpose for which they are intended, mechanical separation of dirt particles may sufficiently separate the relatively large dirt particles from the air stream but it is well known that some type of filter element is typically required to separate the fine dirt particles from the air stream. Further, the cleaners having a single chamber with a filter element mounted therein subject the filter element to both the large particles and the small particles causing the filter element to clog. This clogged filter element results in reduction in the airflow through the vacuum cleaner which, in turn, results in reduced performance of the vacuum cleaner.

Therefore, the need exists for a new and improved dirt collecting system for a bagless vacuum cleaner which is capable of separating both large particles and small particles from a stream of air, and which separates the large particles from the air stream before the air stream is filtered by the filter element.

SUMMARY OF THE INVENTION

Objectives of the invention include providing a new and improved dirt collecting system for use in a bagless vacuum cleaner.

A further objective is to provide a new and improved dirt collecting system which provides improved sustained filtration performance.

A still further objective is to provide a new and improved dirt collecting system for use in a bagless vacuum cleaner which may be easily emptied after use.

These and other objectives will be readily apparent from the following description taken in conjunction with the accompanying drawings.

In carrying out the invention in one form thereof, these objectives and advantages are obtained by providing a dirt collecting system, including a first dirt collecting chamber; a second dirt collecting chamber laterally disposed relative to the first dirt collecting chamber; and an apertured wall extending between the first and second dirt collecting chambers, said apertured wall being formed with an aperture which provides fluid communication between said first and second dirt collecting chambers.

BRIEF DESCRIPTION OF DRAWINGS

Embodiments of the invention, illustrative of several modes in which applicants have contemplated applying the principles are set forth by way of example in the following description and are shown in the drawings and are particularly and distinctly pointed out and set forth in the appended claims.

FIG. 1 is a perspective view of a vacuum cleaner which includes one embodiment of the present dirt collecting system;

FIG. 7 is a top plan view of the dirt cup of FIG. 6;

FIG. 8 is a top plan view similar to FIG. 7 with the dirt cup lid removed;

FIG. 9 is a sectional view taken along line 9—9, FIG. 6;

FIG. 10 is a greatly enlarged sectional view taken from FIG. 9 showing the apertured wall;

FIG. 10A is a sectional view similar to FIG. 10 showing a second embodiment of the aperatured wall;

FIG. 10B is a sectional view similar to FIG. 10 showing a third embodiment of the apertured wall;

FIG. 13 is a sectional view taken along line 13—13, FIG. 7;

Similar numerals refer to similar parts throughout the drawings.

DESCRIPTION OF THE PREFERRED EMBODIMENT

Figure 1A:
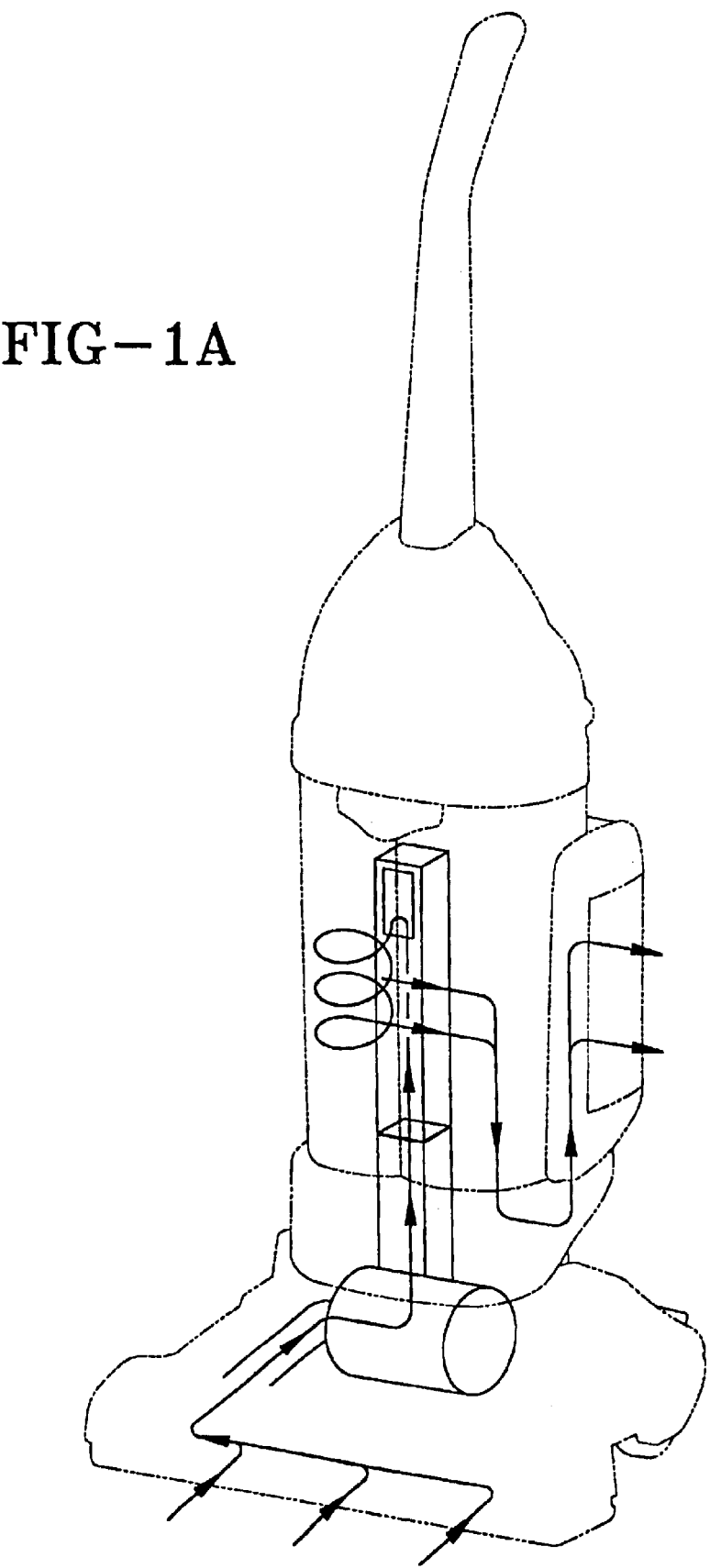
FIG. 1A is a diagrammatic view showing the vacuum cleaner of FIG. 1 having a direct air system.
Figure 1B:
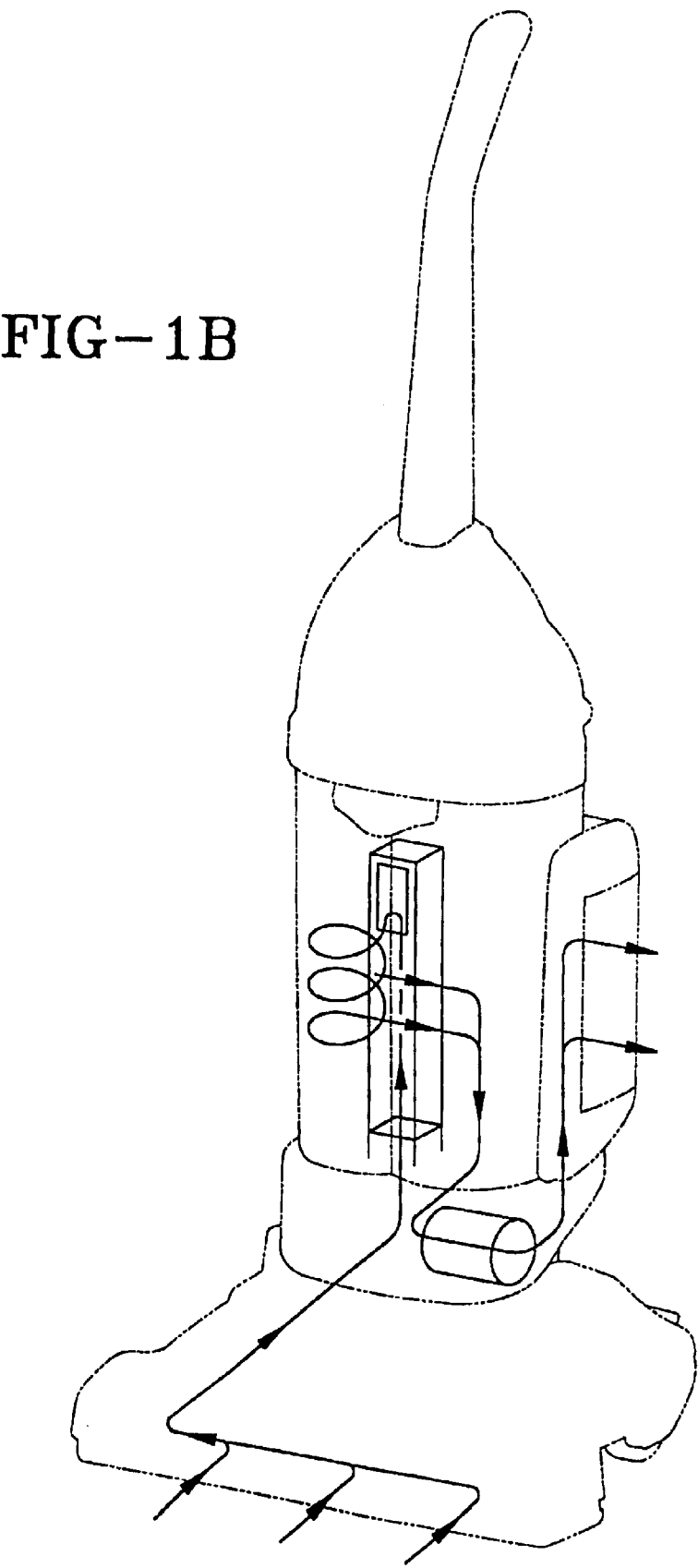
FIG. 1B is a diagrammatic view showing the vacuum cleaner of FIG. 1 having an indirect air system.
Figure 2:
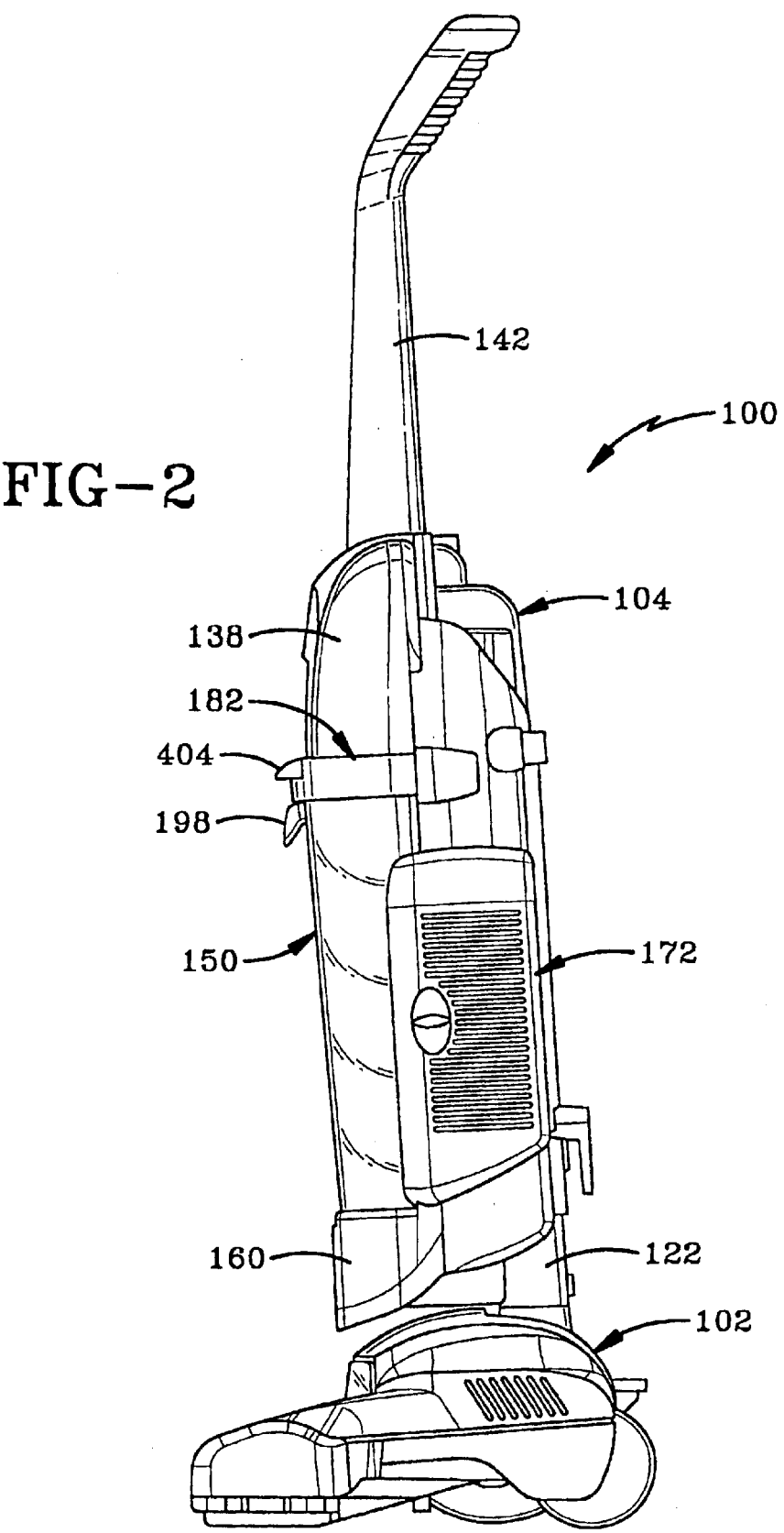
FIG. 2 is a side elevational view of the vacuum cleaner of FIG. 1.

A vacuum cleaner incorporating the present dirt collecting system is shown in FIG. 1 and is indicated generally at 100. Vacuum cleaner 100 includes a vacuum cleaner foot 102 and a vacuum cleaner housing 104 connected to the vacuum cleaner foot 102. The foot 102 is formed with a bottom nozzle opening 106 (FIG. 3) which opens towards a floor surface 108. An agitator 110 is positioned within an agitator chamber 112 which communicates with the nozzle opening 106. The agitator 110 rotates about a horizontal axis for loosening dirt from the floor surface 108. A motor-fan assembly 114 is positioned within the foot 102 and is fluidly connected to the agitator chamber 112 by a dirt duct 116. It is understood that although motor-fan assembly 114 is shown positioned on the foot 102, the motor-fan assembly could instead be positioned within housing 104 without affecting the concept of the invention. Motor-fan assembly 114 creates a suction at an inlet opening 118 thereof which, in turn, creates a suction in dirt duct 116, agitator chamber 112 and nozzle opening 106. This suction draws the loosened dirt from floor surface 108 into nozzle opening 106 and creates a stream of dirt-laden air which travels through the agitator chamber, dirt duct and into the motor-fan assembly, as indicated by arrows A of FIG. 3. The stream of dirt-laden air is blown upwardly through an outlet 120 of the motor-fan assembly, as shown by arrows B of FIG. 3, and into a dirt duct 122 (FIGS. 2 and 4) formed in the vacuum cleaner housing 104.

In the present embodiment, the vacuum cleaner housing 104 is pivotal relative to the foot 102 with dirt duct 122 telescoping over motor-fan outlet 120 to provide fluid communication therebetween. Vacuum cleaner housing 104 is formed with a rear wall 130 (FIG. 4), a pair of side walls 132 and 134 extending outwardly from rear wall 130, a bottom wall 136 and a top handle cover 138. The rear wall 130, side walls 132 and 134, bottom wall 136 and top handle cover 138 form a front cavity 140 for receiving a dirt cup or container 150 (shown in detail in FIGS. 5–9 and 12–14). The top handle cover 138 tapers upwardly to an upper handle 142 of the vacuum cleaner 100 and is formed with a front central indented area 152 which opens upwardly to form a carry handle 154 (best seen in FIGS. 17–19). Dirt duct 122 of the housing has a duct opening 156 which is formed in the bottom wall 136 and which is positioned adjacent to the rear wall 130. An inlet seal 158 is positioned about the duct opening 156.

Referring back to FIG. 4, a dirt cup housing support 160 is positioned within housing 104 with a top surface 162 thereof partially forming bottom wall 136. The top surface 162 of housing support 160 is formed with a recessed area 164 for receiving and supporting the dirt cup 150, as described below. A circular outlet opening 166 is formed in the top surface 162 of the housing support 160 with an outlet seal 168 extending about the inner edge thereof. The outlet opening 166 communicates with a discharge duct 170 which directs the air downwardly into the dirt cup housing support 160 then turns upwardly along the side wall 132 of the housing to communicate with a discharge system 172. The discharge or exhaust system 172 of vacuum cleaner 100 is generally similar to that shown and described in U.S. Pat. No. 5,946,771 which is incorporated herein by reference.

Figure 16:
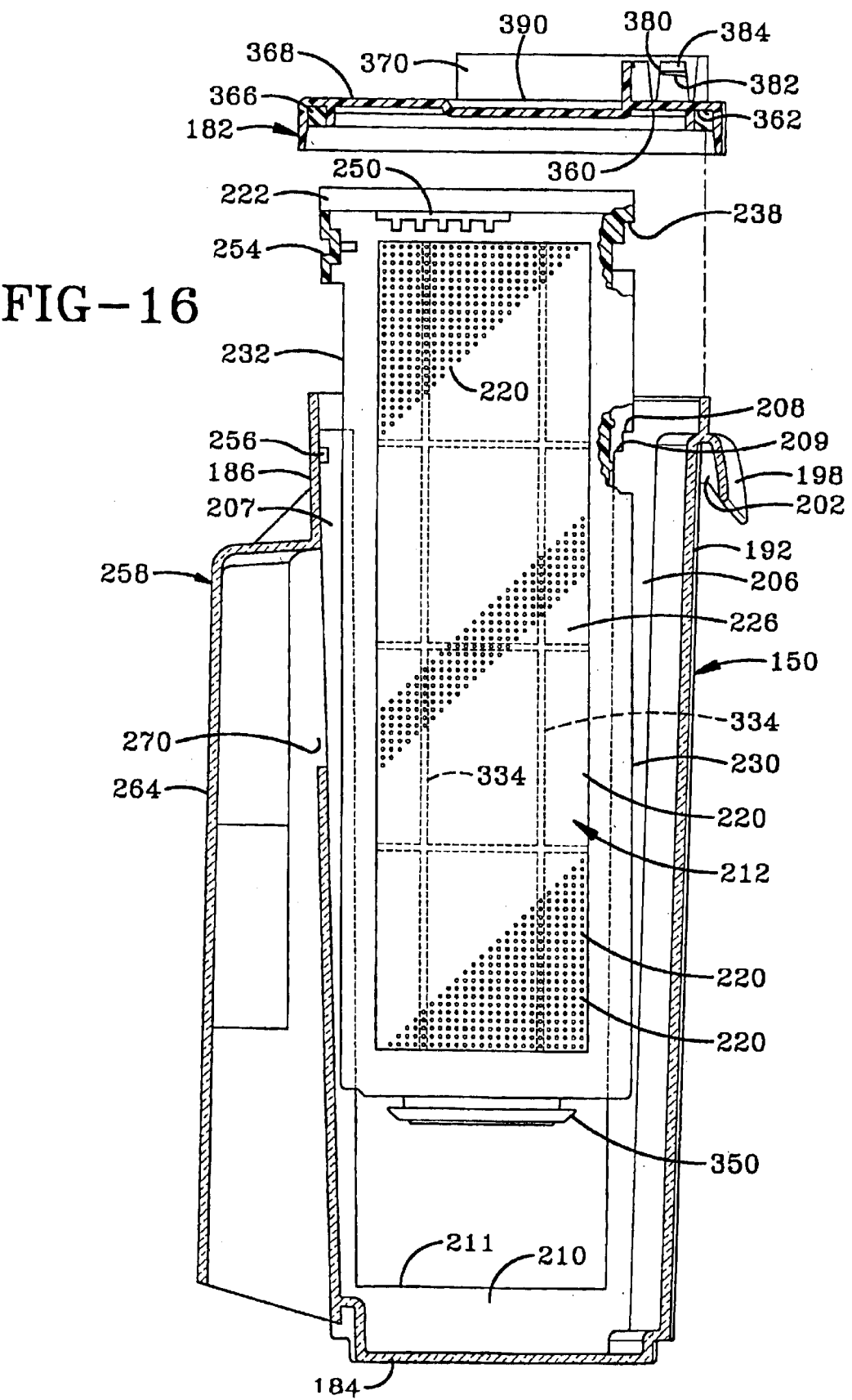
FIG. 16 is a sectional view similar to FIG. 12 showing the filter assembly partially exploded from the dirt cup.

The present dirt collecting system is shown in FIGS. 5–13 and generally includes the dirt cup 150, a filter assembly 180 removably mounted within the dirt cup 150 and a dirt cup lid 182 which encloses the dirt cup 150. The dirt cup 150 includes a bottom wall 184 (FIG. 6), a generally flat rear wall 186 (FIG. 8), a pair of curved side walls 188 and 190, and a front wall 192. Rear wall 186, side walls 188 and 190 and front wall 192 extend upwardly from the bottom wall 184 to form a dirt cup chamber 194. Front wall 192 curves inwardly from each side wall to form a front center indentation 196 (FIG. 9) in the dirt cup 150 which gives the dirt cup an appearance of having two dirt separation chambers. A finger handle 198 is formed centrally on the front wall 192 adjacent a top edge 200 (FIG. 8) of the dirt cup 150. Finger handle 198 extends outwardly and downwardly to form a pocket 202 (FIG. 12) for receiving a user's fingers when the dirt cup 150 is removed from or placed on the vacuum cleaner 104. The bottom of bottom wall 184 of the dirt cup 150 is formed with an inwardly stepped portion 204 (FIG. 6) which is received within the recessed area 164 of the housing support 160. An exhaust port 205 (FIG. 13) extends upwardly from the bottom wall 184 of the dirt cup. A front guide rib 206 (FIG. 9) extends inwardly from the front wall 192 of the dirt cup 150, and a rear guide rib 207 extends inwardly from the rear wall 186 of the dirt cup 150. The front guide rib 206 is formed with a top step 208 (FIG. 16) and a bottom step 209 at an inner top edge thereof. A partition wall 210 extends upwardly from the bottom wall 184 of the dirt cup 150. Partition wall 210 extends between the front wall 192 and the rear wall 186 of the dirt cup and includes a top edge 211 which sits approximately ¾ inches above the bottom wall 184. In the present embodiment, the dirt cup is a one-piece member molded of ABS and includes an anti-static additive to prevent dirt from electro-statically adhering to the walls of the dirt cup. However, it is understood that the dirt cup may be formed of any number of suitable materials, and particularly plastic materials, without affecting the concept of the invention.

Figure 5:
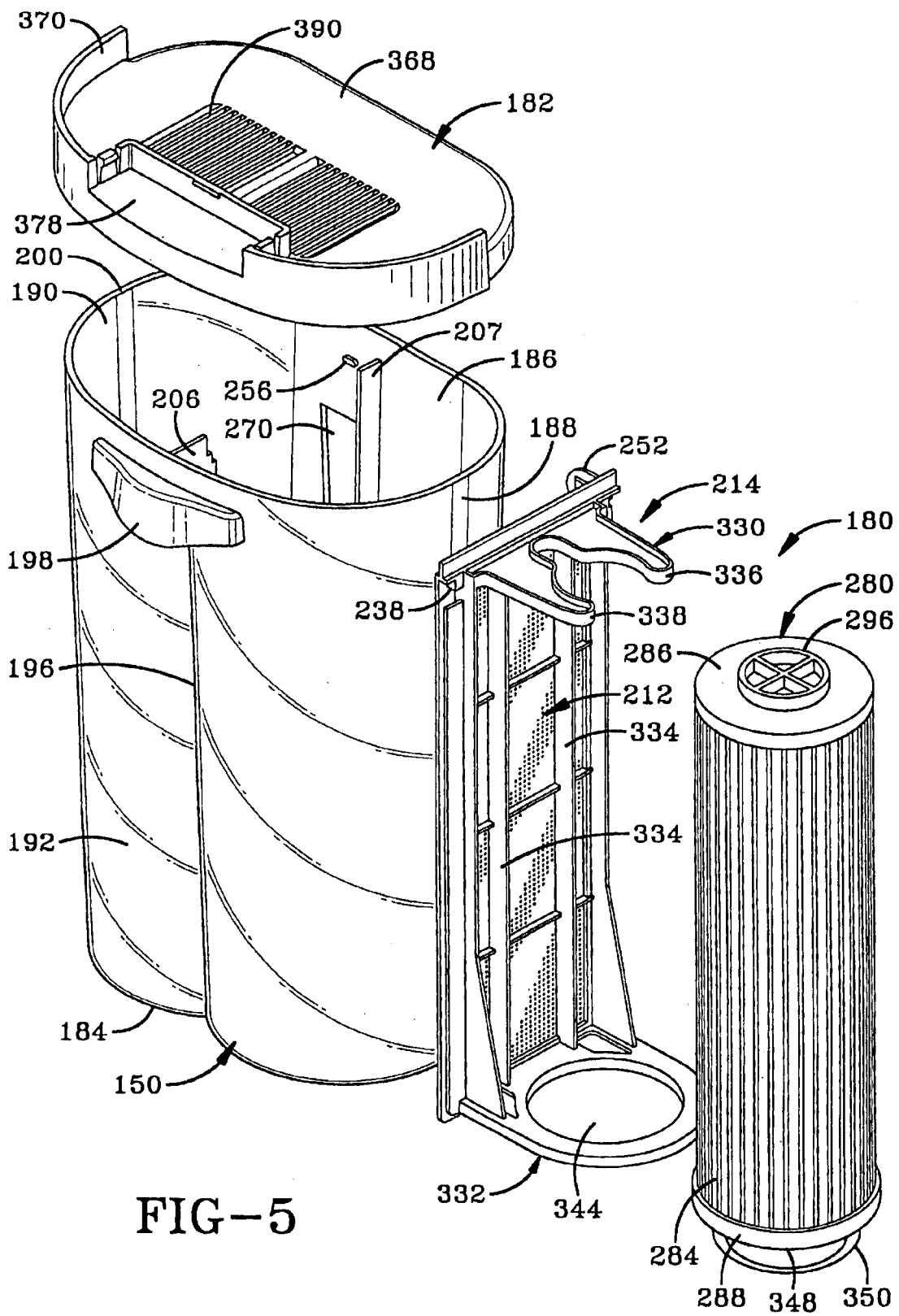
FIG. 5 is a perspective view of the dirt cup showing a filter assembly exploded therefrom.

Referring to FIG. 5, the filter assembly 180 generally includes an apertured wall 212, a filter support 214 extending from the apertured wall 212 and a primary filter member 280 which removably mounts on the filter support 214. The filter assembly 180, and particularly the apertured wall 212 thereof, along with the partition wall 210 separate the dirt cup chamber 194 into a first dirt collecting chamber 216 and a second dirt collecting chamber 218 (FIGS. 8, 9 and 13). The apertured wall 212 is positioned between rear wall 186 and front wall 192 and is formed with a plurality of apertures or holes 220. The holes 220 provide for fluid communication between the first dirt collecting chamber 216 and the second dirt collecting chamber 218.

The apertured wall 212 functions as a coarse particle separator or pre-filter and could include any number of holes having various shapes (circular, square, elliptical, etc.), sizes and angles. To maximize airflow through the holes while still preventing large debris from passing therethrough, it is desirable to form the holes as large as 0.0036 square inches and as small as a 600 mesh screen. In the present embodiment, the holes 212 are circular with a hole diameter of approximately 0.030 inches. Further, the apertured wall should be formed with enough total opening area to maintain airflow through the dirt cup. It is desirable to form apertured wall with a total opening area of between approximately 2.5 square inches to approximately 4 square inches. In the present embodiment, there are approximately 196 holes/inch$^2$ with the holes 212 form a total opening area of approximately 3.2 square inches. In the present embodiment, the apertured wall 212 is a one-piece member integrally molded of a plastic material, such as a polypropylene and may include an anti-static additive to prevent dirt from electro-statically adhering thereto. However, it is understood that the apertured wall may be formed of a number of different materials such as metal or synthetic mesh or screens, cloth, foam, a high-density polyethylene material, apertured molded plastic or metal, or any other woven, non-woven, natural or synthetic coarse filtration materials without affecting the concept of the invention.

FIGS. 10, 10A and 10B are cross sections of three alternative embodiments of molded plastic screens that may be used to form the apertured wall 212. It will be appreciated that molded screens having other configurations than those described and illustrated may be employed. FIG. 10 illustrates a molded screen panel 450 formed with apertures or holes 452 that extend straight through the panel, forming a right angle with an upstream surface 454 and a downstream surface 456 of the panel. The holes 452 may be formed with tapered outer edges on the upstream surface 454 and the downstream surface 456 of the panel. Arrow D illustrate the air stream as it enters the dirt cup 150 and impinges upon the screen panel 450. The incoming air must make a sharp turn in order to pass through the apertures 452 in the panel 450. Because of the relatively large mass and momentum of the dirt relative to the air, the dirt contained within the air stream will travel past the apertures while a portion of the air will turn and flow through the apertures. Furthermore, the remaining portion of the incoming air stream blows across the upstream surface 454 of panel 40, and blows away any debris that may have accumulated on the upstream surface of the screen panel. The incoming air stream thereby keeps a portion of the screen panel substantially clear of debris, as described below.

FIG. 10A illustrates a second embodiment of the apertured wall and includes a molded screen panel 460. Molded screen panel 460 is formed with apertures or holes 462 at an acute angle relative to the incoming air stream, as indicated by arrows D. The apertures 462 of screen panel 460 require the incoming air stream to perform a relatively sharp turn to pass through the apertured wall. Again, a portion of the relatively light air is able to make the turn while the relatively heavy debris flows past the apertures and the remaining air blows across the screen removing any particles which have accumulated on the screen panel.

FIG. 10B illustrates a third embodiment of the apertured wall and includes a molded screen panel 470. Screen panel 470 is formed with apertures 472 which extend at an even more acute angle to the incoming air stream (arrows D) than the apertures of panel 460 of FIG. 10A. An upstream surface 474 of screen panel 470 is formed with a ramped outer surface 476 and a straight inner surface 478. Ramped outer surface 476 extends generally parallel to apertures 472 and forms an acute angle with the incoming air stream similar to that of apertures 472. Straight inner surfaces 478 extend inwardly from the outer tip of ramped surfaces 476 to form a right angle with a downstream surface 480 of the screen panel. Apertures 472 open towards the straight inner surface 478. The ramped outer surface 476 guides the incoming air stream outwardly away from screen panel 470 requiring the air to perform a sharp turn to pass through the apertured wall. Again, a portion of the relatively light air is able to make the sharp inward turn while the relatively heavy debris flows past and away from the apertures. As with the above embodiments, the dirt contained within the incoming air stream will impinge on any particles which have accumulated on the screen panel to substantially clean a portion of the screen panel.

Figure 15:
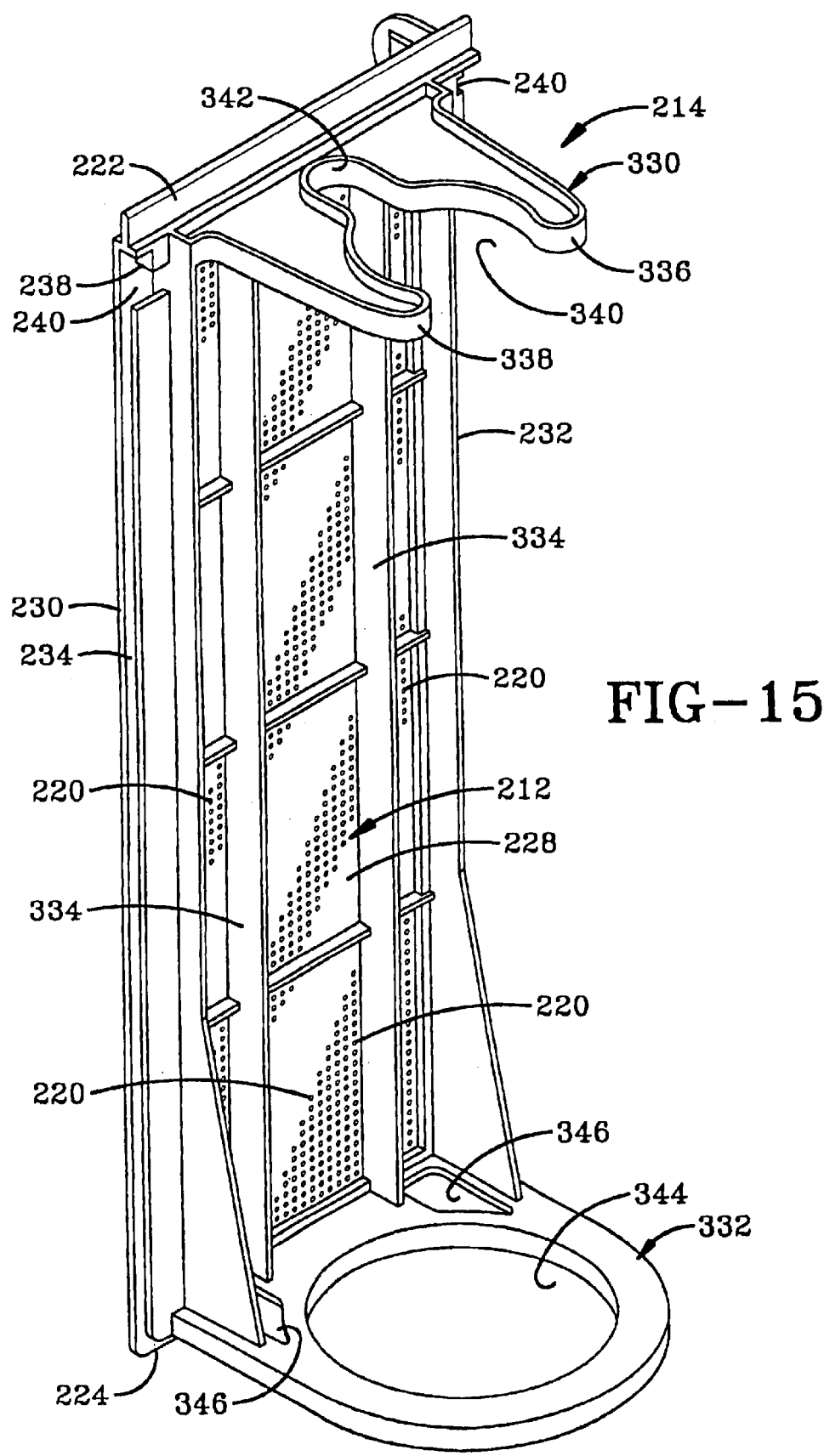
FIG. 15 is a perspective view of the apertured wall and filter supports.

Referring to FIG. 15, the apertured wall 212 includes a top 222, a bottom 224, a first upstream side 226 (FIGS. 12 and 16) which faces and partially forms first dirt collecting chamber 216, a second downstream side 228 which faces and partially forms second dirt collecting chamber 218, a front end 230 and a rear end 232. Each of ends 230 and 232 of the apertured wall 212 is formed with a generally vertically extending channel 234 and 236, respectively (FIG. 9). As shown in FIG. 9, channels 234 and 236 slidingly receive guide ribs 206 and 207, respectively, of the dirt cup 150 for removably mounting the filter assembly 180 within the dirt cup chamber 194. One side of the front channel 234 is formed with a top rest 238 (FIG. 15) which abuts the top step 208 of the front guide rib 206 to support filter assembly 180 within the dirt cup 150. A notch 240 is formed in each of ends 230 and 232 of the apertured wall adjacent to the top thereof which communicates with respective channels 234 and 236. The notches 240 provide openings through which dirt trapped in the channels may be expelled therefrom. A bottom channel 242 (FIG. 13) is formed on the bottom 224 of the apertured wall 212 for receiving the top edge 211 of partition wall 210. A lip 244 extends downwardly from the bottom of the apertured wall to form one side of bottom channel 242. The lip 244 is positioned within the first dirt collecting chamber 216 juxtaposed with partition wall 210. The lip 244 overlaps a portion of the partition wall 210 to form a labyrinth seal between first dirt collecting chamber 216 and second dirt collecting chamber 218 as shown in FIG. 13.

Figure 13A:
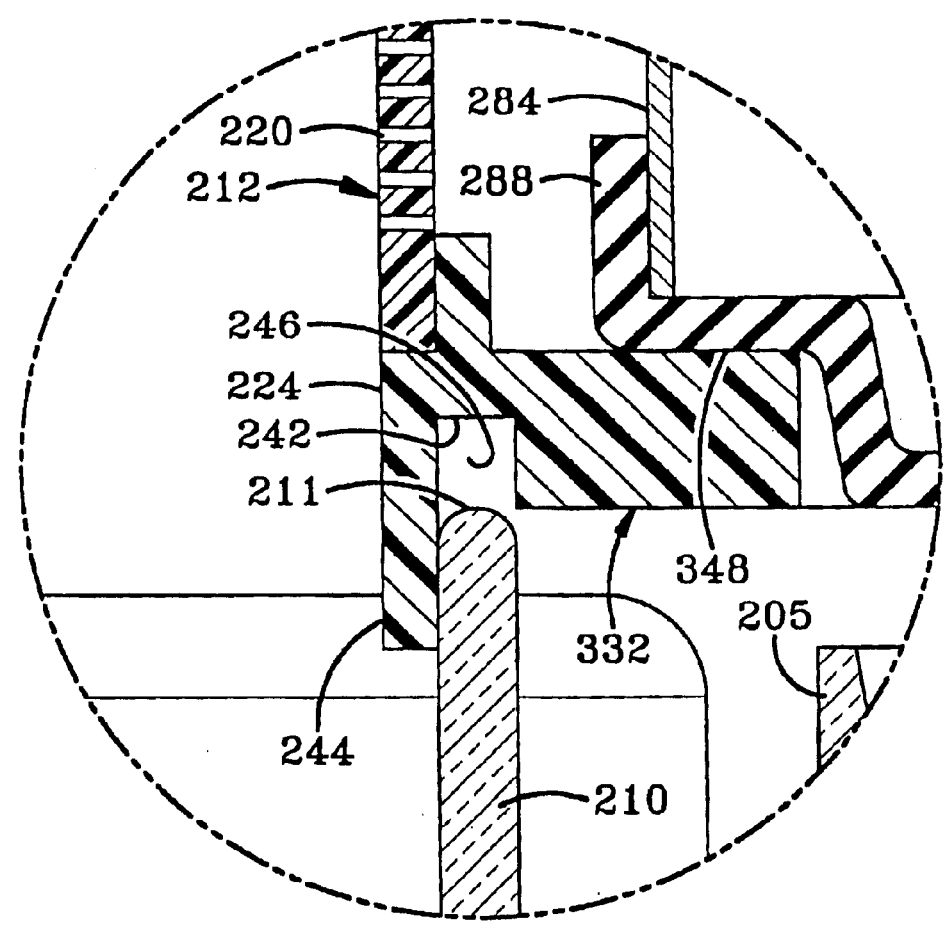
FIG. 13A is an enlarged sectional view of the encircled portion of FIG. 13.

As shown in detail in FIG. 13A, the top step 208 stops the filter assembly 180 before the bottom 224 of apertured wall 212 contacts the top edge 211 of partition wall 210, thus maintaining a gap 246 between the partition wall 210 and the apertured wall 212. It is understood however, that apertured wall 212 may abut and rest on the partition wall 210 without affecting the concept of the invention. A horizontal tab 250 (FIG. 8) extends outwardly from the apertured wall 212 and is positioned adjacent to the top 222 thereof. Horizontal tab 250 provides an area for grasping the filter assembly 180 as well as an area upon which an upward force may be applied for removal of the filter assembly from dirt cup 150. A vertical tab 252 (FIG. 13) extends outwardly from one end of the apertured wall 212 and is positioned adjacent to the top 222 thereof. Vertical tab 252 provides an area for grasping the filter assembly 180 during placement within and removal from the dirt cup 150. A horizontally extending recess 254 (FIG. 14) is formed in the vertical tab 252 which faces the rear wall 186 of the dirt cup 150. A horizontally rib 256 extends outwardly from the rear wall 186 of the dirt cup 150 to frictionally engage the recess 254. The frictional engagement between the rib 256 and the recess 254 retains the filter assembly 180 within the dirt cup chamber 194 during emptying of the dirt cup 150, as described below.

Figure 14:
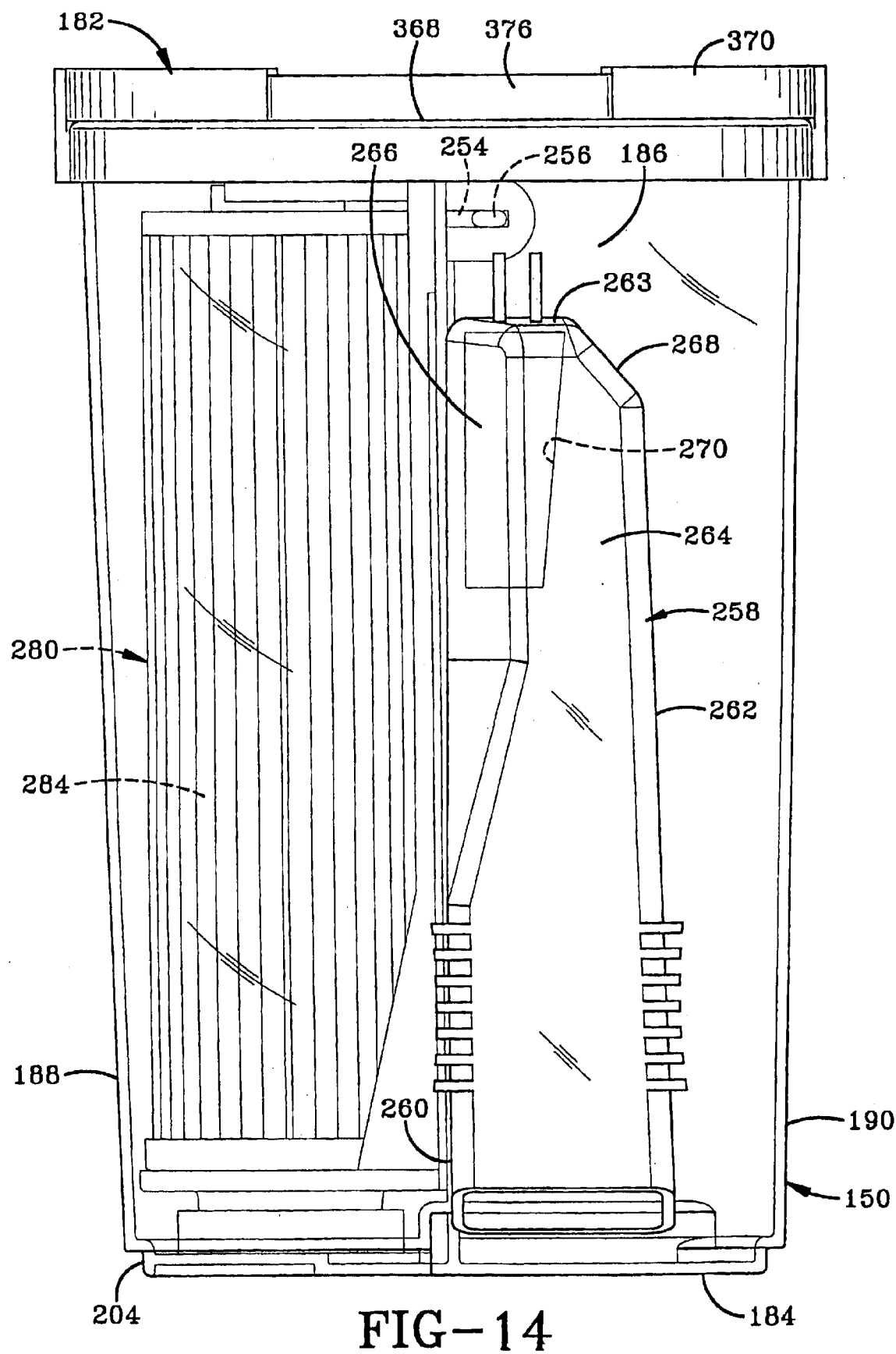
FIG. 14 is a rear elevational view of the dirt cup.

Referring to FIG. 14, a dirt duct 258 is formed integrally with the dirt cup 150 and includes a pair of opposed side duct walls 260 and 262, a top duct wall 263, and a rear duct wall 264 extending between and connecting side duct walls 260 and 262. Side duct wall 260 is formed with a horizontally inclined or inwardly angled upper portion 266 which causes the air stream flowing within dirt duct 258 to enter the dirt cup in at an acute angle to the apertured wall. The dirt duct 258 is formed with a flat truncated corner 268 between side duct wall 262 and top duct wall 263. Dirt duct 258 communicates with the dirt duct 116 of vacuum cleaner housing 104 with the inlet seal 158 sealing the connection therebetween. An inlet opening 270 (FIGS. 6 and 13) is formed in the rear wall 186 of the dirt cup 150 for providing fluid communication between the dirt duct 258 and the first dirt-collecting chamber 216. Inlet opening 270 is generally rectangular in shape with a slight inward top-to-bottom taper and is positioned adjacent the apertured wall 212 for inputting the dirt-laden air stream into first dirt collecting chamber 216, as described below in further detail. It is understood that although the dirt duct 258 is shown formed integrally with the dirt cup 150, dirt duct 258 may be formed on the vacuum cleaner housing 104 with inlet opening 270 communicating therewith at the rear of the dirt cup 150. Inlet seal 158 would be positioned about the duct opening to provide fluid air-tight communication between the dirt duct 258 of the housing and inlet opening 270.

Referring to FIG. 13, the inlet opening 270 directs the dirt-laden air towards the apertured wall 212 at an acute angle. By directing the air stream angularly at the wall, the incoming air from the inlet opening acts to clean the apertured wall by impinging on any dirt particles which have accumulated thereon. By cleaning the apertured wall, the incoming airflow prevents a build-up of dirt on the apertured wall which may clog the holes 220 and reduce airflow through the dirt collecting system which, in turn, will reduce performance of the vacuum cleaner. This self-cleaning feature of the filter assembly is created by a combination of the angle the upper portion 266 of the side duct wall 260 and the size of the inlet opening 270. Too large of an inlet opening does not produce a sufficient air flow velocity to displace accumulated dirt particles from the apertured wall. Too small of an inlet opening will restrict air flow through the system and reduce cleaning performance of the vacuum cleaner 100. It is desirable to form the inlet opening with total opening size of between approximately 1.5 to 4.0 inch$^2$. In the present embodiment, inlet opening 270 has a total opening size of approximately 2.4 inch$^2$.

Figure 3:
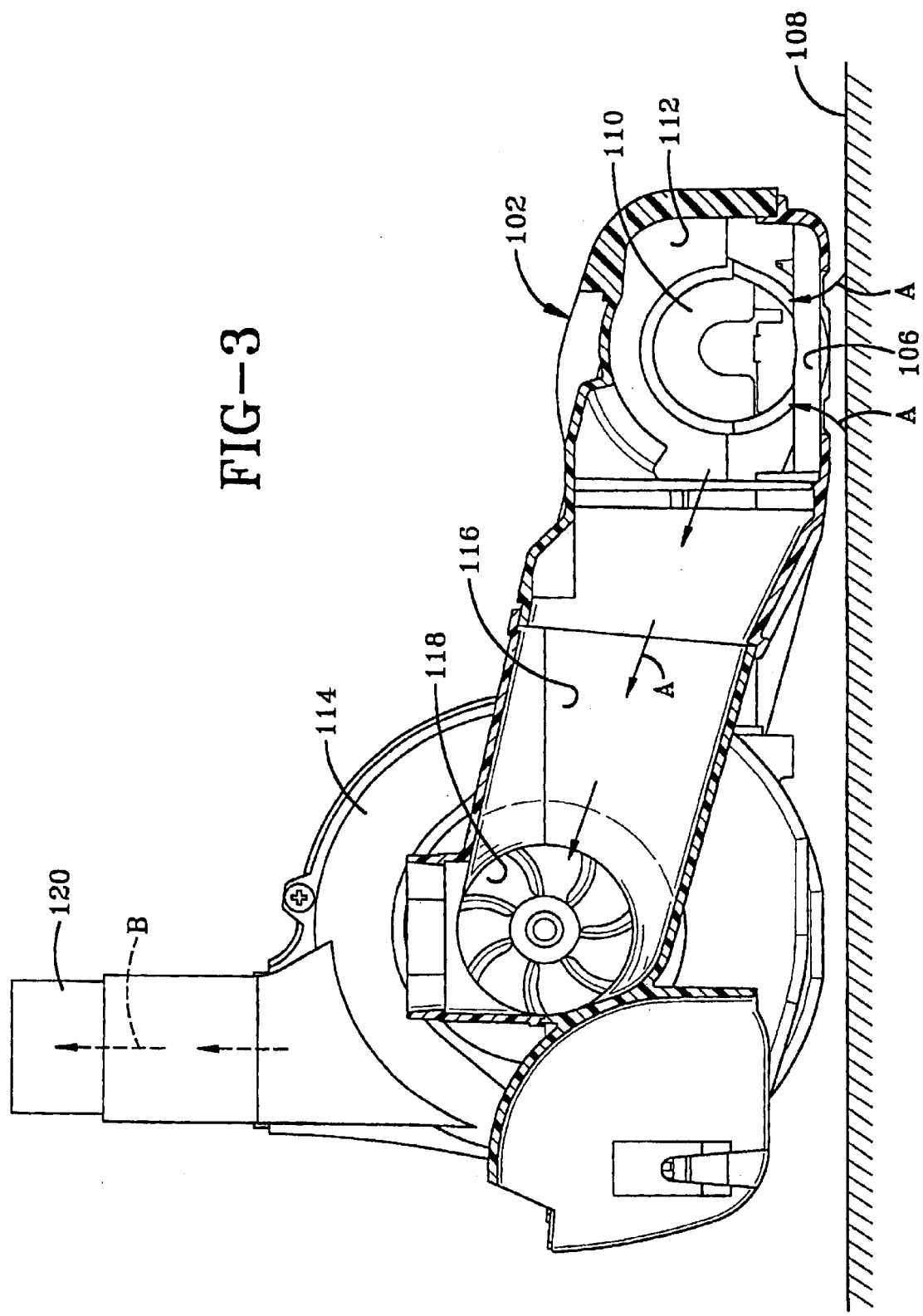
FIG. 3 is a sectional view of the foot of the vacuum cleaner of FIG. 1 showing air flowing through the direct air system.

After the stream of dirt laden air is drawn into the motor-fan assembly it is blown out motor-fan outlet 120, as shown by arrows B of FIG. 3. The dirt-laden air flows through the dirt duct 122 of the housing 104 and the dirt duct 258 of the dirt cup 150, as shown by arrows C of FIG. 12. As the air flows upwardly through dirt duct 258, the dirt flowing adjacent to side duct wall 262 will deflect off truncated corner 268 and flow towards angled upper portion 266 of side duct wall 260. The angled upper portion 266 of the side wall 260 directs the air stream angularly through inlet opening 270 and towards the apertured wall 212, as indicated by arrows D of FIGS. 9, 10 and 13. The dirt-laden air flows across apertured wall 212 and is directed towards the front wall 192 of the dirt cup 150. Because front wall 192 and side wall 190 of the dirt cup 150 are curved, the air stream flows along these walls and begins a cyclonic action within the first dirt collecting chamber 216. Additionally, because the dirt-laden air stream is flowing from the confined area of the dirt ducts into the relatively large area of the first dirt collecting chamber 216, the first dirt collecting chamber acts as an expansion chamber allowing the air stream to expand and reduce its velocity. This expansion and reduced velocity or slowing of the air stream, along with the cyclonic action within the first dirt collecting chamber allows the relatively heavy dirt particles and other relatively heavy debris to separate and fall from the air stream. These separated dirt particles collect in the first dirt collecting chamber 216. The air stream then flows through the holes or apertures 220 formed in the apertured wall 212 thus providing additional coarse separation of relatively large dirt particles and other debris from the air stream.

Referring to FIG. 13 and in accordance with the invention, a filter member 280 is positioned within the second dirt collecting chamber 218 and is supported above the bottom wall 184 of the dirt cup by a filter support 214. Filter member 280 is a generally cylindrical or tubular member formed by a pleated filter material or media 284 potted within a closed top end cap 286 and a circular open bottom end cap 288. The filter material 284, the top end cap 286 and the bottom end cap 288 form a cylindrical interior 290 of filter member 280. Pleated filter material 284 is shown in detail in FIG. 11 and forms a plurality of adjacent outwardly extending peaks 292 and inwardly extending valleys 294 which increase the amount of filter surface area available to the filter member as compared to a flat sheet cylindrical filter. Referring back to FIG. 13, the top end cap 286 is formed with an upwardly extending circular post 296 having a diameter smaller than that of the top end cap. A support cage 300 is positioned within the cylindrical interior 290 of the filter member 280 to provide inward support for pleated filter material 284. Support cage 300 is potted within the closed top end cap 286 and includes a plurality of downwardly extending posts 302 interconnected by three spaced circular rings 304. The outer surface of posts 302 and rings 304 abut the inner surface of the pleated filter material to prevent the filter media from collapsing inwardly when an air pressure is applied against the outer surface of the filter element.

Figure 11:
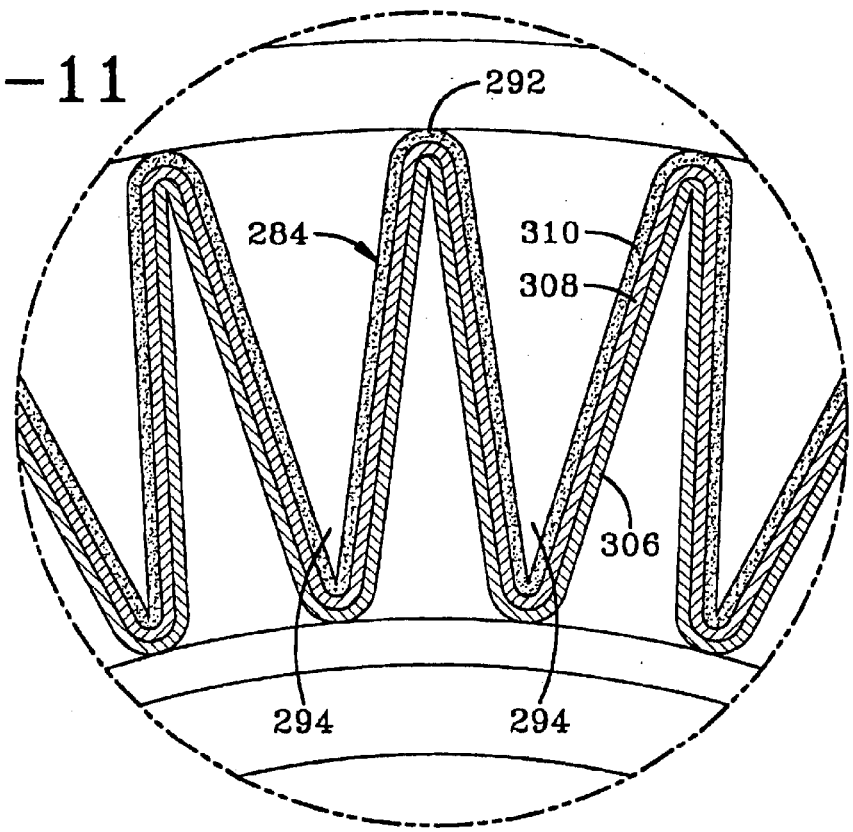
FIG. 11 is a greatly enlarged sectional view of the encircled portion of FIG. 9.
Figure 11A:
FIG. 11A is a diagrammatic view of the pleated filter material of FIG.11.
Figure 11B:
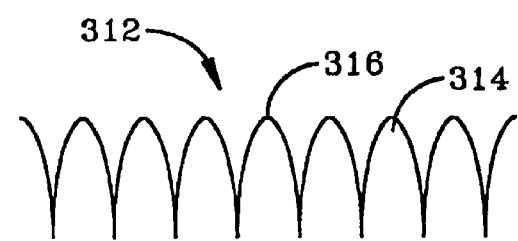
FIG. 11B is a diagrammatic view similar to FIG. 11A showing a second embodiment of the pleated filter material.
Figure 11C:
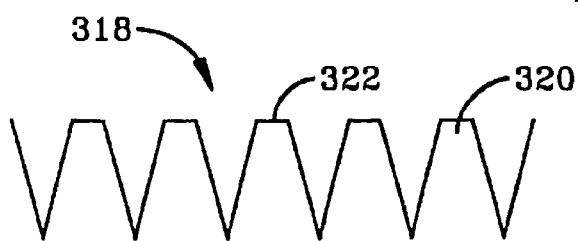
FIG. 11C is a diagrammatic view similar to FIG. 11A showing a third embodiment of the pleated filter material.
Figure 12:
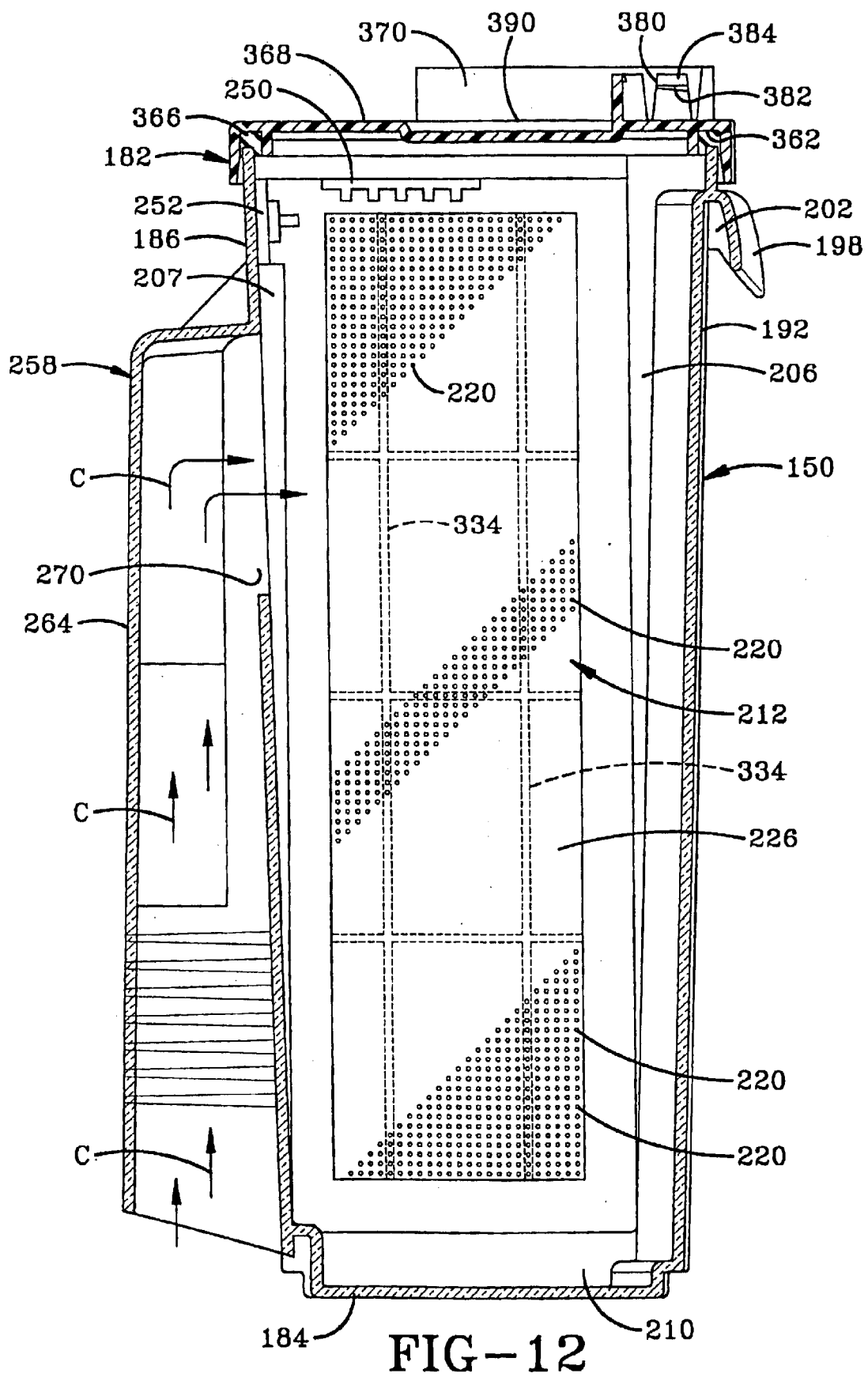
FIG. 12 is a sectional view taken along line 12—12, FIG. 6.

Filter material 284 is shown in detail in FIG. 11 and includes a first inner layer 306 formed of a melt-blown polypropylene, a second middle layer 308 formed of a spun-bond polyester and an outer third layer 310 formed of an expanded polytetrafluoroethylene (ePTFE) membrane. The ePTFE outer layer 310 provides non-stick properties to the filter member 280 and allows any dirt or dust accumulated on the filter member to be easily displaced therefrom. Although the filter material 284 is shown and described as having three layers, it is understood that the filter material may include any number of layers or be formed of any number of materials such as a micro-glass or a melt-blown polyester without affecting the concept of the invention. Additionally, the filter material 284 may be formed of a moldable bi-component polyester material having outer ePTFE layer 310 attached to the upstream surface thereof. In the present invention, for example, it is desirable for the filter material 284 to provide high efficiency particulate air (HEPA) filtration. However, filter media that does not meet HEPA levels of filtration may also be employed in accordance with the present invention. For example, micro-filtration media which remove common allergens from the air, but do not meet HEPA filtration standards, are well known in the art and may be used in place of HEPA filtration media. Further, although the filter material 284 is shown in FIGS. 9, 11 and 11A as being pleated with symmetrically formed peaks and valleys, the filter material may include alternate shaped pleats. For example, FIG. 11B shows a filter material 312 which includes rounded valleys 314 upstream of the airflow which form corresponding rounded peaks 316 downstream of the airflow. FIG. 11C shows a filter material 318 having flat squared-off valleys 320 upstream of the airflow which form corresponding flat peaks 322 downstream of the airflow. Forming the filter material with the rounded valleys 314 or flat valleys 320 may reduce the amount of dirt and debris that gets wedged within the pointed valleys of the filter material of FIG. 11A thus allowing the filter element 280 to be more easily cleaned by a user.

Figure 6:
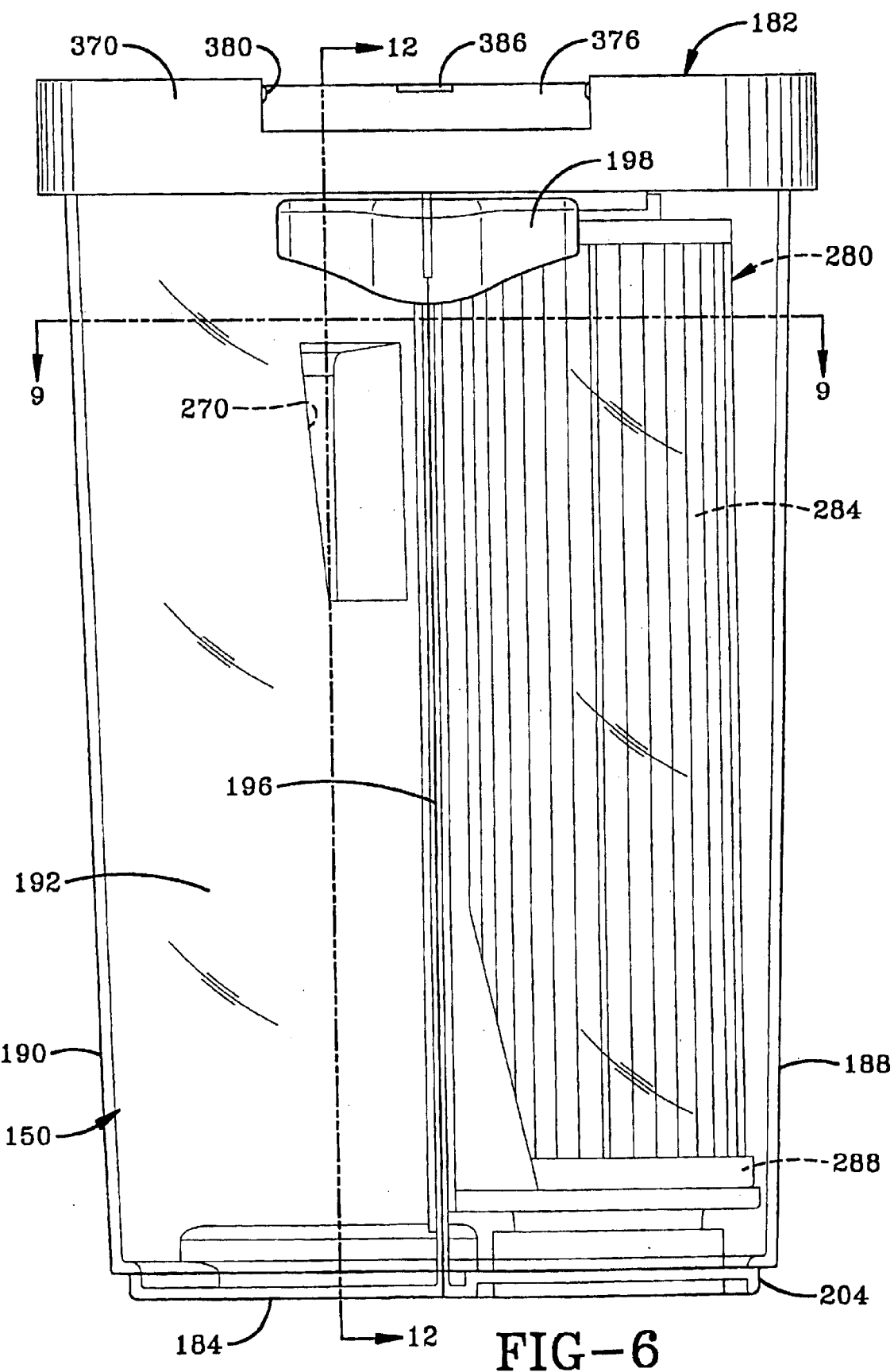
FIG. 6 is a front elevational view of the dirt cup with the filter assembly contained therein.

Referring to FIG. 15, the filter support 214 extends outwardly from the apertured wall 212 and includes a top filter support member 330 and a bottom filter support member 332. A pair of deflector walls 334 extend vertically along apertured wall 212 between top filter support member 330 and bottom filter support member 332. The top filter support member 330 has a pair of outwardly extending opposed fingers 336 and 338 which receive the circular post 296 of the top end cap 286. Fingers 336 and 338 extend horizontally from the apertured wall to form an opening 340 therebetween which narrows into a smaller cutout area 342. Cutout area 342 provides sufficient flexibility to the fingers 336 and 338 to allow the fingers to deflect outwardly when the circular post 296 is inserted within or removed from the top filter support member 330. Bottom filter support member 332 is formed with a circular opening 344 for receiving and supporting the open bottom end cap 288 of the filter member 280, as described below. A center of circular opening 344 of the bottom filter support member aligns with the center of the opening 340 of the top filter support member 330 to vertically support the filter member 280 within the second dirt collecting chamber 218 as shown in FIGS. 6 and 13.

Referring back to FIG. 15, a pair of holes 346 is formed in the bottom filter support member 332 on each side thereof to allow dirt filtered in the second dirt collecting chamber 218 to settle to the bottom of the dirt cup 150.

Referring to FIG. 13, the open bottom end cap 288 of the filter member 280 has an outer diameter greater than that of circular opening 344 of bottom support member 332 and includes an inward step 348 which engages and rests on the bottom filter support member 332. Open bottom end cap 288 is formed of an injection molded urethane and includes a thin upwardly and outwardly extending flared seal 350. The bottom end cap 288 extends down into the exhaust port 205 whereby the flared seal 350 of the filter member 280 deflects against the inner surface of exhaust port 205 to provide an airtight seal between bottom end cap 288 and the inner surface of the exhaust port 205. This air tight relationship between the flared seal 350 and the exhaust port 205 provides fluid communication between the interior 290 of the filter member 280 and the outlet opening 166 of the vacuum cleaner housing 104. When dirt cup 150 is assembled on vacuum cleaner housing 104, bottom wall 184 of the dirt cup 150 sits on the dirt cup housing support 160 with the outlet seal 168 sandwiched therebetween. Outlet seal 168 seals the connection between the exhaust port 205 and the outlet opening 166.

As the air stream flows through apertured wall 212 into the second dirt collecting chamber 218, deflector walls 334 deflect the air stream straight into the second dirt collecting chamber in a direction perpendicular to the apertured wall 212. The air stream flows around the filter member 280 and through the filter material 284 to the interior 290 of the filter member, as indicated by arrows E of FIG. 13. The filter member 280 functions as a primary filter to separate the smaller lighter dirt particles from the air stream which passed through the apertured wall 212. The filtered particles fall to the bottom of the second dirt collecting chamber 218 with the holes 346 of the bottom filter support member allowing the dirt to settle below the bottom filter support member. This area between the bottom filter support member 332 and the bottom of dirt cup 150 forms a settling chamber 354 which has a reduced airflow therein. The dirt particles which collect within this settling chamber 354 are not subjected to the higher airflows within the second dirt collecting chamber which would agitate the collected dirt particles causing the dirt particles to become airborne and possibly collect on the filter member. As shown by arrows E of FIG. 13, the air stream is directed downwardly within the interior 290 of the filter element 280 and out the bottom of the dirt cup through the exhaust port 205. The exhausted air flows into discharge duct 170, where it is again filtered by the final filter of the exhaust system before being exhausted into the atmosphere.

Referring to FIG. 13, the dirt cup 150 is enclosed by the dirt cup lid 182. The lid 182 removably mounts on the top edge 200 (FIG. 8) of the dirt cup 150 for enclosing the dirt cup chamber 194. Lid 182 has a bottom surface 360 which is formed with a peripheral groove 362 and a center groove 364 extending between and connecting a front and rear portion of the peripheral groove 362. A lid seal 366 is positioned within the peripheral groove 362 and the center groove 364 to seal dirt cup chamber 194. The top 222 of apertured wall 212 sits flush with the top of the front guide rib 206 and slightly below the top edge of the dirt cup. The center groove 364 receives the top 222 of apertured wall 212 and the top of the front guide rib 206 (FIG. 12) for sealing the top of first dirt collecting chamber 216 from the top of second dirt collecting chamber 218.

Referring to FIG. 7, the lid 182 is formed with a top surface 368 having an upwardly extending wall 370 around a portion of the peripheral edge of the lid. The wall 370 extends inwardly at a center portion thereof with a pair of side walls 372 and 374, and a back wall 376 forming a recessed area 378. A latching tab 380 is formed on each of the side walls 372 and 374 with each latching tab including a flat latching shoulder 382 (FIG. 12) and an angled top surface 384. A back latching tab 386 extends outwardly from the back wall 376 into recessed area 378. A plurality of spaced parallel ribs 390 are formed on the top surface 368 of the lid 182 behind and adjacent to back wall 376. Ribs 390 extend in a front to rear direction and are formed with a rounded top surface 392 (FIG. 13).

Figure 17:
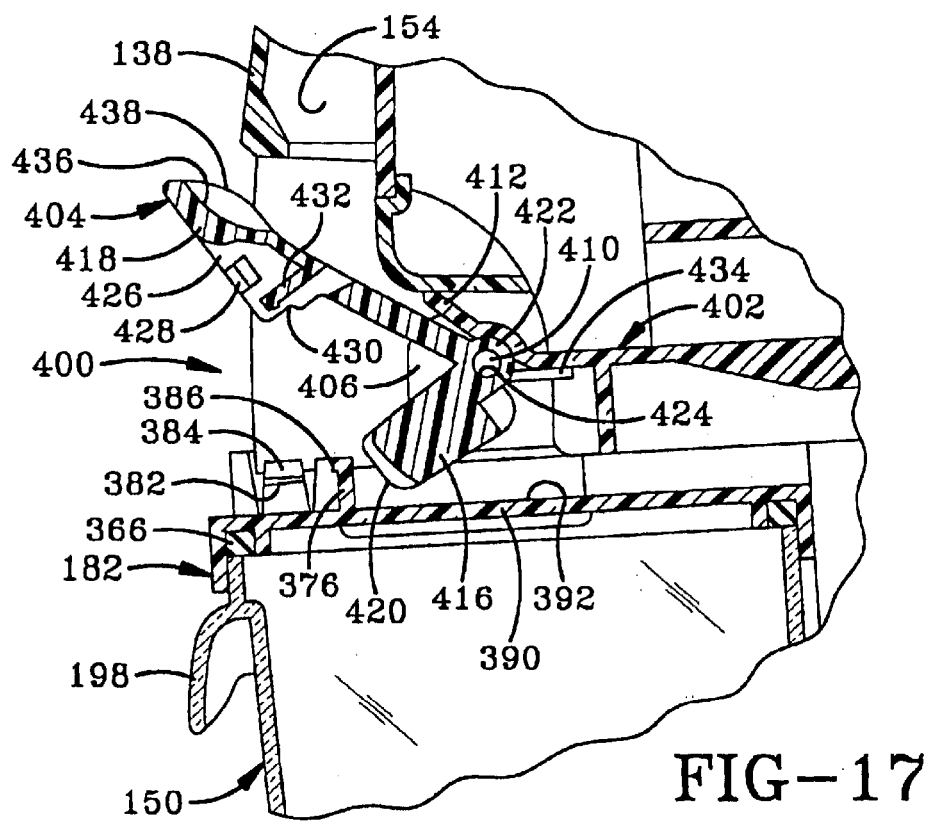
FIG. 17 is an enlarged sectional view showing the latching mechanism in an open position.
Figure 18:
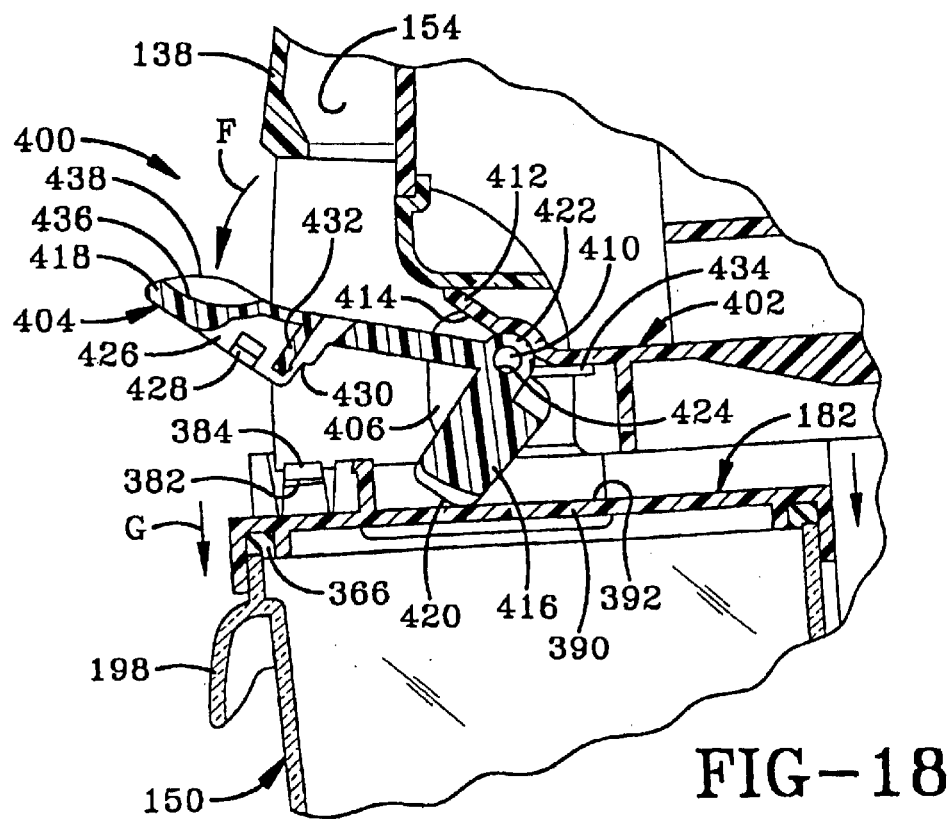
FIG. 18 is an enlarged sectional view similar to FIG. 17 showing the latching mechanism being pivoted to a closed position.
Figure 19:
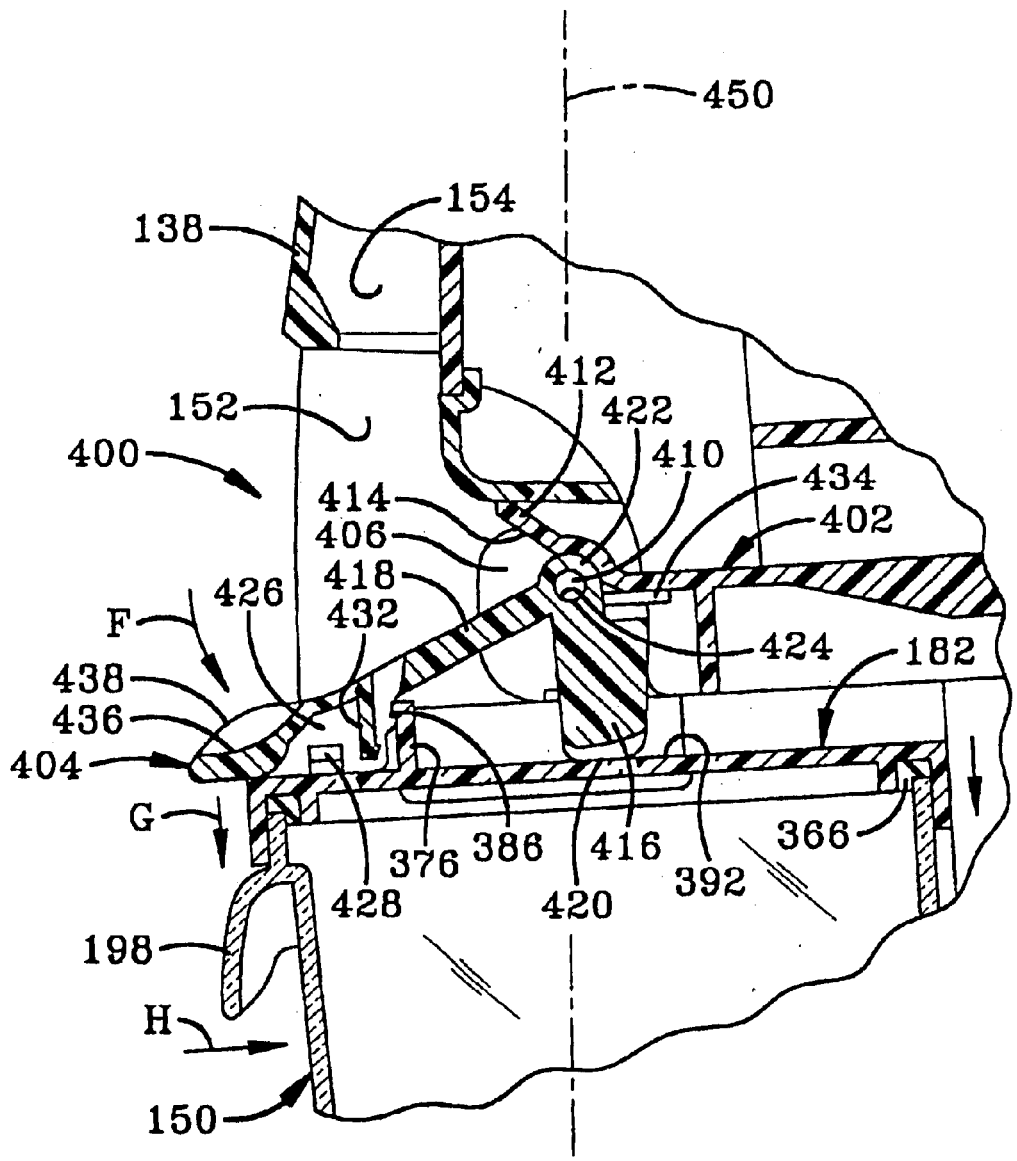
FIG. 19 is an enlarged sectional view similar to FIG. 18 showing the latching mechanism in the closed position.

Referring to FIGS. 17–19, the lid 182 is engaged by a latching mechanism 400 which is mounted within the indented area 152 of the top handle cover 138. Latching mechanism 400 is movable between a latched position of FIG. 19 and an unlatched position of FIG. 17. Latching mechanism 400 includes a latch support 402 and a latch member 404 pivotally mounted on the latch support 402. The latch support 402 is rigidly secured to the vacuum cleaner housing 104 and includes a pair of opposed ends 406 each of which are formed with a circular hole. The holes of ends 406 are aligned with one another to receive a pivot shaft 410. A stop 412 having a flat surface 414 is located centrally between the ends 406 and extends upwardly at an angle relative to the lid 182. The latch member 404 includes a camming portion 416 and a handle portion 418 extending angularly relative to the camming portion 416. The camming portion 416 is formed with a curved bottom camming surface 420 which cams against the ribs 390 of the dirt cup lid 182, as described below. A cylindrical boss 422 extends between the camming portion 416 and the handle portion 418, and is formed with a circular hole 424 for receiving the pivot shaft to pivotally mount the latch member 404 to the latch support 402. The handle portion 418 of the latch member 404 includes a pair of side walls 426 extending downwardly therefrom. Each side wall 426 includes an outwardly extending nub 428. The nubs 428 are engaged by the side latching tabs 380 of the lid 182 to retain the latching mechanism in the latched position of FIG. 19. A pair of ramped surfaces 430 are formed on a rear of the side walls 426 of the handle portion 418. A retaining wall 432 extends downwardly from the handle portion 418 and is formed with a rearwardly extending lip 434. Retaining wall 432 prevents the dirt cup 150 from being pulled outwardly from the vacuum cleaner housing 104 when latching mechanism 400 is in the closed position. A spring 434 is positioned on the pivot shaft 410 for biasing the latch member to the unlatched position of FIG. 17. A front curved indentation 436 is formed in a top surface 438 of the handle portion 418 for comfortably receiving a user's thumb during operation of the latching mechanism.

The dirt cup 150 is assembled by first placing open bottom end cap 288 of the filter member 280 within the opening 344 of the bottom filter support member 332 (FIG. 5). The filter member 280 is pivoted towards the apertured wall 212 with the circular post 296 of the top end cap 286 camming between the fingers 336 and 338 of the top filter support member 330. The cut-out area 342 allows the fingers 336 and 338 to deflect outwardly permitting the circular post 296 to be inserted within the opening 340 of the top filter support member 330 as shown in FIG. 8. The stepped shoulder 348 of the open bottom end of the filter element rests on the top surface of the bottom support member 332, as shown in FIG. 13. In its assembled positioned, the filter member 280 is supported vertically within the second dirt collecting chamber 218 by the filter support 214 with the flared seal 350 extending out the bottom of the bottom support member.

To assemble the filter assembly 180 into the dirt cup 150, the user aligns the channels 234 and 236 of the apertured wall 212 with their respective guide ribs 206 and 207 of the dirt cup 150, such that the filter member is positioned above the second dirt collecting chamber 218. The filter assembly 180 slides down into the dirt cup chamber 194 until the top rest 238 of front channel 234 abuts and rests on the top step 208 of the front guide rib 206. As shown in FIG. 13A and as described above, the bottom channel 242 is supported slightly above the top edge of the partition wall 210 forming the gap 246 therebetween. The lip 244 overlaps a portion of the partition wall forming a labyrinth seal at the bottom of apertured wall 212. When the filter assembly 180 is in the full inserted position, the rib 256 of the rear wall 186 of the dirt cup is frictionally engaged within recess 254 of the vertical tab 252 (FIG. 14). In this assembled position, the flared seal 350 of the filter member 280 extends within the exhaust port 205, as described above.

Figure 4:
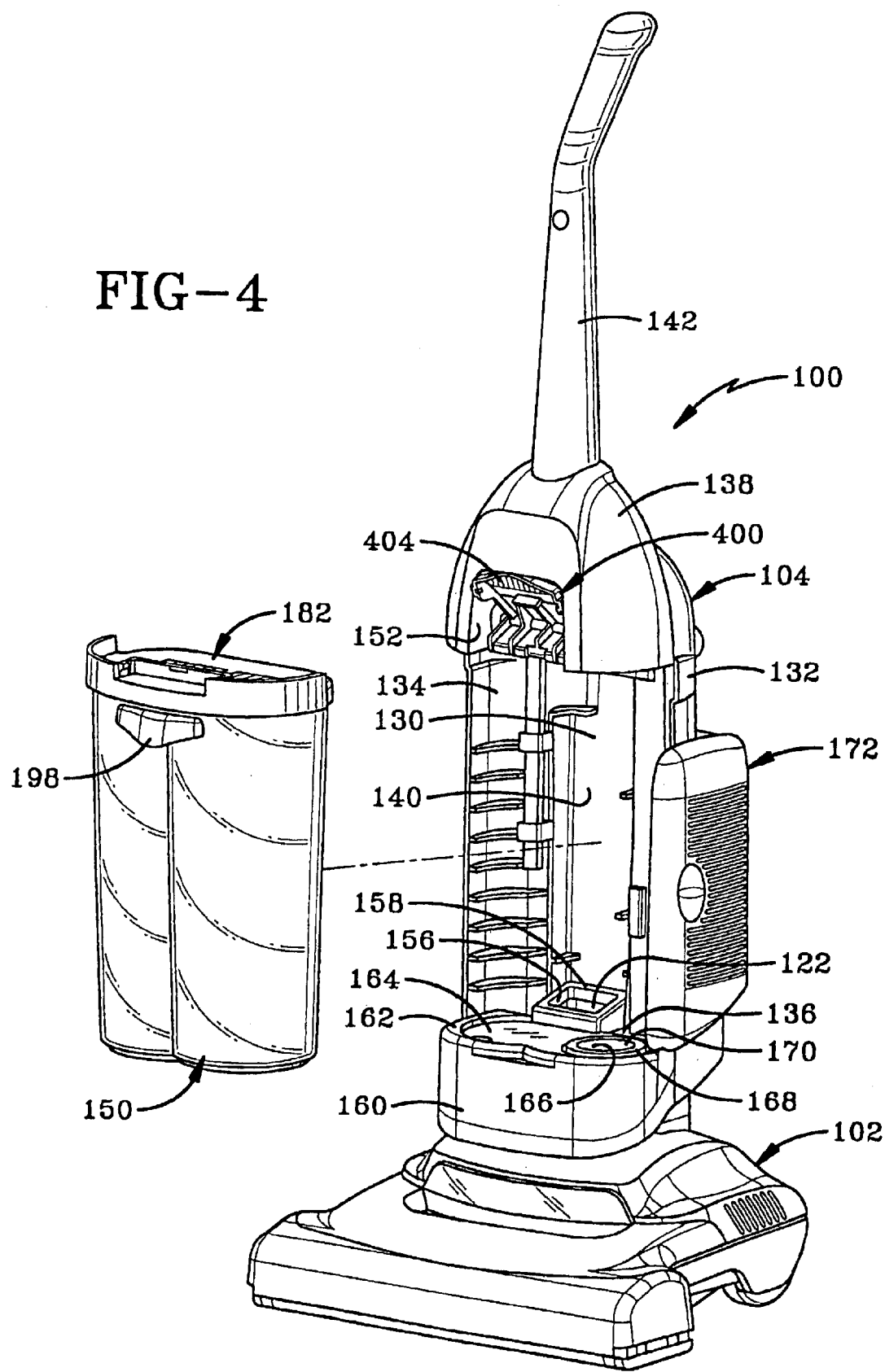
FIG. 4 is a perspective view showing the dirt cup exploded from the vacuum cleaner housing.

Referring to FIG. 13, the dirt cup lid 182 is placed on the top of the dirt cup 150 with the peripheral groove 362 engaging the top edge of the dirt cup and the center groove 364 engaging the top of the apertured wall and the top of the front guide rib with the lid seal 366 sandwiched therebetween. The dirt cup is then held by the finger handle 198 and is inserted horizontally into the front cavity 140 of the vacuum cleaner housing 104 (FIG. 4). When the dirt cup is fully inserted into the housing, the dirt cup is lowered to seat the stepped portion 204 of the bottom wall of the dirt cup within the recessed area 164 of the dirt cup housing support 160.

Once the dirt cup is seated within the housing, the latching mechanism 400 is moved into the latched position by applying a downward force on the handle portion 418 of the latch member 404 as indicated by arrow F, FIGS. 18 and 19. As shown in FIG. 18, latch member 404 pivots about the pivot shaft 410 causing the camming surface 420 of the camming portion to engage and cam against the ribs 390 of the dirt cup lid 182. The rounded top surface 392 of the ribs 390 reduces the surface-to-surface contact between the latch member 404 and the lid 182 allowing the latch member to be easily moved between the latched and unlatched positions. The camming portion 416 applies a downward pressure on the lid 182 as indicated by arrows G, FIGS. 18 and 19. This downward pressure compresses the lid seal 366, the inlet seal 158 and the outlet seal 168. Because the dirt cup 150 is connected to the positive pressure end of the motor-fan assembly, the dirt-laden air stream input into the dirt cup creates a high positive pressure within the first and second dirt collecting chambers. This high pressure within the dirt cup is applied upwardly on the lid 182 and absent latching mechanism 400, the pressure would blow the lid 182 off of the dirt cup. Referring to FIG. 19, the latch member 404 continues to pivot about the pivot shaft 410 until the handle portion 418 sits within the recessed area 378 (FIG. 1) and contacts dirt cup lid 182, and the camming portion 416 cams past a vertical axis 450 which extends through the center of the pivot shaft 410 while maintaining contact with the dirt cup lid 182. This over-center position of the latch member 404, and particularly the camming portion 416 thereof retains the latching mechanism 400 in the closed, latched position of FIG. 19. The over-center position of the camming member actually tightens latching mechanism 400 against the ribs 390 to retain the lid 182 on the dirt cup 150.

As the handle portion 418 moves into the recessed area 378, the nubs 428 of the handle portion cam against the angled top surface 384 of side latching tabs 380 of the lid to deflect the latching tabs outwardly. When the nubs clear the angled top surface, the latching tabs snap back to trap the nubs beneath the latching shoulders 382 with the latching shoulders assisting in retaining the latching mechanism in the closed, latched position. Further, as the handle portion 418 pivots downwardly into the recessed area 378, ramped surfaces cam against the top of back wall 376 of the lid to pull the dirt cup 150 rearwardly towards the rear wall 130 of the vacuum cleaner housing and retain the dirt cup in a vertical position on the housing. The retaining wall 432 extends past the top of back wall 376 to prevent the dirt cup from being pulled horizontally outwardly while the latching mechanism 400 is in the latched position.

The bagless vacuum cleaner 100 is operated as described above with the dirt, dust and debris being filtered from the dirt-laden air stream and collected within the first dirt collecting chamber 216 and the second dirt collecting chamber 218. After a quantity of dirt has accumulated within the first and second dirt collecting chambers, the dirt cup 150 must be removed from the vacuum cleaner 100 for emptying thereof. To remove the dirt cup 150 from the vacuum cleaner housing 104, the user applies an upward pressure on the handle portion 418 of latch member 404 to pivot the latching mechanism in a direction opposite arrow F, FIGS. 18 and 19. The camming portion 416 cams against the ribs 390 of the lid until the camming portion is positioned on the opposite side of the vertical axis 450 whereby the spring 434 moves the latch member 404 upwardly until the handle portion 418 abuts the stop 412 of the latch support 402 (FIG. 17).

The dirt cup 150 is lifted upwardly and outwardly for removal from the vacuum cleaner housing and is transported to a waste container. The lid 182 is removed from the dirt cup and the dirt cup is inverted to empty the contents thereof into the waste container. The holes 346 allow the dirt which has accumulated within the settling chamber 354 to pass therethrough and be emptied into the waste container. The frictional engagement between recess 254 of the vertical tab 252 and the rib 256 prevents the filter assembly 180 from inadvertently falling from the dirt cup when the dirt cup is inverted. In the event further cleaning of the dirt cup is required, an upward force is applied to horizontal tab 250 and filter assembly 180 is lifted from the dirt cup chamber 194. Any dirt which may have accumulated on the apertured wall or on the filter member may be brushed or otherwise removed therefrom. The filter assembly is re-inserted into the dirt cup as described above. The spring 434 retains the latching mechanism 400 in the open, unlatched position and prevents the latching mechanism from interfering with the dirt cup when the dirt cup is being inserted within the front cavity 140 of the housing.

During insertion of the filter assembly back into the dirt cup, any dirt, which has accumulated within either of the channels 234 or 236 of the apertured wall will be forced upwardly within the channels and fall out the notches 240. Absent notches 240, the dirt accumulated within the channels will be compacted therein as the filter assembly 180 slides along the guide ribs 206 and 207. This accumulated and compacted dirt will buildup at the top of the channels and prevent the filter assembly from being fully inserted within the dirt cup.

Accordingly, the swirling of the cyclonic action along with the expansion and slowing of the airflow serves to separate the relatively large and heavy particles of dirt from the air stream upstream of the filter member 280. Thus, clogging of the filter member 280 by such large particles is substantially eliminated, greatly improving sustained performance of the vacuum cleaner 100. Often in prior art systems that locate the filter element in the cyclonic chamber, the filter element becomes caked and clogged with large dirt particles. This clogging of the filter element results in a loss of airflow through the dirt separation system of the vacuum cleaner which, in turn, quickly diminishes the cleaning performance of these prior art vacuum cleaners. Large fibrous and stringy debris also becomes caked, wrapped or otherwise entangled on the filter element of these prior art dirt separation systems.

The apertured wall of the present inventive dirt collecting system filters out such large, fibrous and relatively light debris before the debris contacts the filter element and becomes entangled therewith. Absent the apertured wall, the light fibrous and stringy debris, despite its relative large size, would fail to separate from the air in the first dirt collecting chamber and would become tangled on the filter element. Thus, the apertured wall 212 serves as a preliminary or coarse filter that filters relatively large, fibrous and stringy debris from the air stream upstream of the filter element. The filter element then serves as the primary or fine filter that filters the remaining relatively small, light and fine dirt particles from the air stream.

Referring to FIG. 2A, the present inventive dirt collecting system has been described by way of example above in combination with a direct air or dirty air vacuum cleaner system whereby the dirt-laden air stream is drawn into the motor-fan assembly and is blown through the dirt ducts and into the dirt up. Such a direct air system is diagrammatically illustrated in FIG. 1A and creates a positive pressure within dirt ducts 122, dirt duct 258 as well as within the first and second dirt collecting chambers. However, it will be appreciated that the previously described dirt collecting system is equally applicable to indirect air or clean air vacuum cleaner systems whereby the dirt-laden air is drawn through the dirt ducts and dirt cup and is filtered before entering the motor-fan assembly. Such an indirect air system is diagrammatically illustrated in FIG. 1B which shows the motor-fan assembly located downstream of the dirt cup rather than upstream of the dirt cup as in the direct air system of FIG. 1A. The suction side of motor-fan assembly 114 is in fluid communication with and preferably closely adjacent to exhaust opening 166 of the dirt cup housing support 160. The motor-fan assembly draws air into the dirt cup and through the exhaust port and outlet opening before entering the inlet opening of the fan. The air is then exhausted through the exhaust system 172 and into the atmosphere. This indirect air system of FIG. 1B creates a negative pressure within the dirt cup 150 which, in turn, draws air in through the dirt ducts 258, 122 and 116 as well as through the nozzle opening 106 for removing dirt and debris from the floor surface.

During operation of the vacuum cleaner 100, light, fluffy, fibrous and stringy debris collected in the first dust collecting chamber becomes compacted in the bottom of the first dust collecting chamber during prolonged operation of the vacuum cleaner. As compared with dirt collecting systems which fail to compact the dirt and which quickly fill during operation of the vacuum cleaner, the compacting effect of the present dirt collecting system allows the vacuum cleaner 100 to receive additional amounts of dirt and provides prolonged and sustained airflow through the dirt cup which, in turn, provides for longer continuous operation of the vacuum cleaner.

This compacting effect is diagrammatically illustrated in FIGS. 20A through 20D and is explained below. The dirt-laden air stream is input into the first dirt collecting chamber through the inlet opening 270 located adjacent to the top of the dirt cup. The dirt-laden air stream flows across the apertured wall 212 and into the curved front wall 192 and curved side wall 190 of the dirt cup creating a cyclonic action within the first dirt collecting chamber. As discussed above, the air stream undergoes expansion and slowing as it swirls within the first chamber.

Figure 20A:
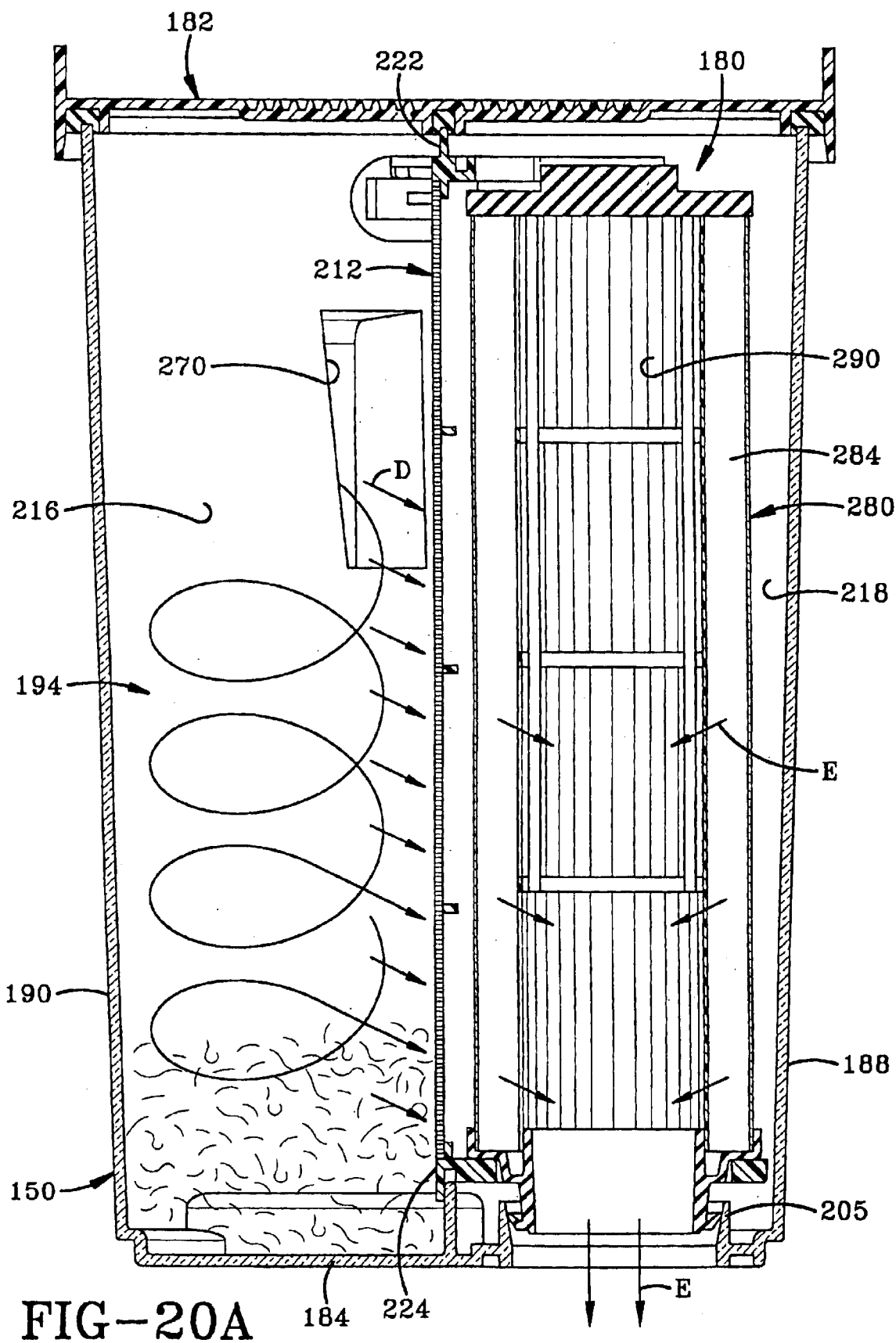
FIG. 20A is a sectional view showing a first stage of dirt accumulation within the dirt cup.

Because the inlet opening is positioned adjacent to the top of the first dirt collecting chamber, there exists a high pressure in the upper portion of the first chamber. Likewise, because the exhaust port is located at the bottom of the second dirt collecting chamber, there exists a low pressure in the lower portion of the second dirt collecting chamber. The apertured wall 212 allows this low pressure to exist in the lower portion of the first dirt collecting chamber as well as in the second dirt collecting chamber. As the air stream enters the first dirt collecting chamber, it will flow to the area of least pressure and exit the first chamber at the lower portion thereof. As the air stream passes through the apertured wall at the lower portion of the first dirt collecting chamber, the lower part of the apertured wall performs a majority of the coarse particle separation which results in a build-up of dirt particles on the lower part of the wall as illustrated in FIG. 20A. This build-up of particles causes partial clogging of the lower part of the apertured wall.

Figure 20B:
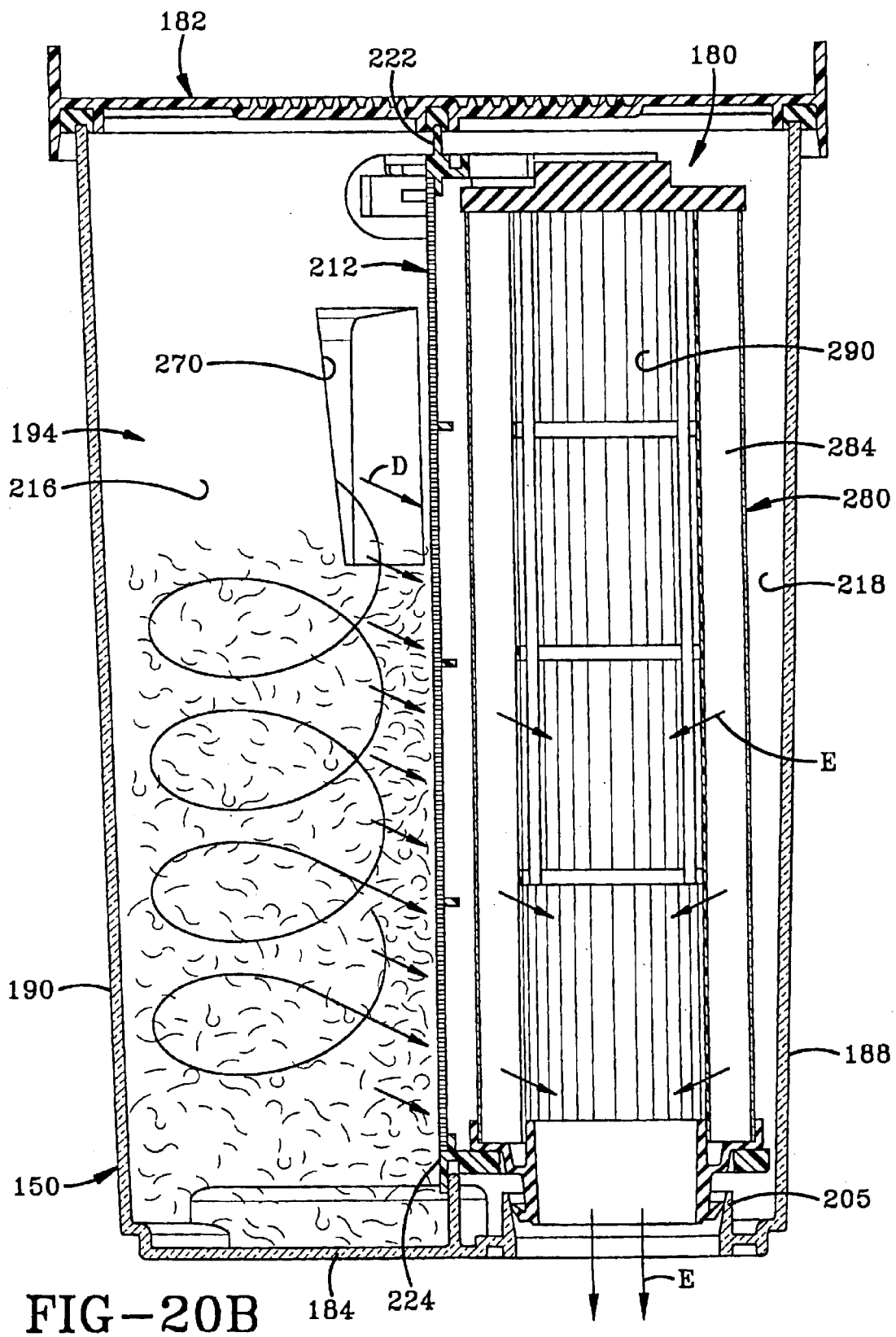
FIG. 20B is a sectional view similar to FIG. 20A showing a second stage of dirt accumulation within the dirt cup.

As the lower part of the apertured wall becomes partially clogged, the air stream will seek the path of least resistance and least pressure, which has now been raised to a middle part of the apertured wall due to the partial clogging of the lower part of the apertured wall. Eventually, partial clogging will occur at the middle part of the apertured wall in a similar manner to that described for the lower part of the apertured wall. The middle part of the wall performs a majority of the coarse particle separation which results in a build-up and partial clogging of the middle part of the wall, as shown in FIG. 20B.

Figure 20C:
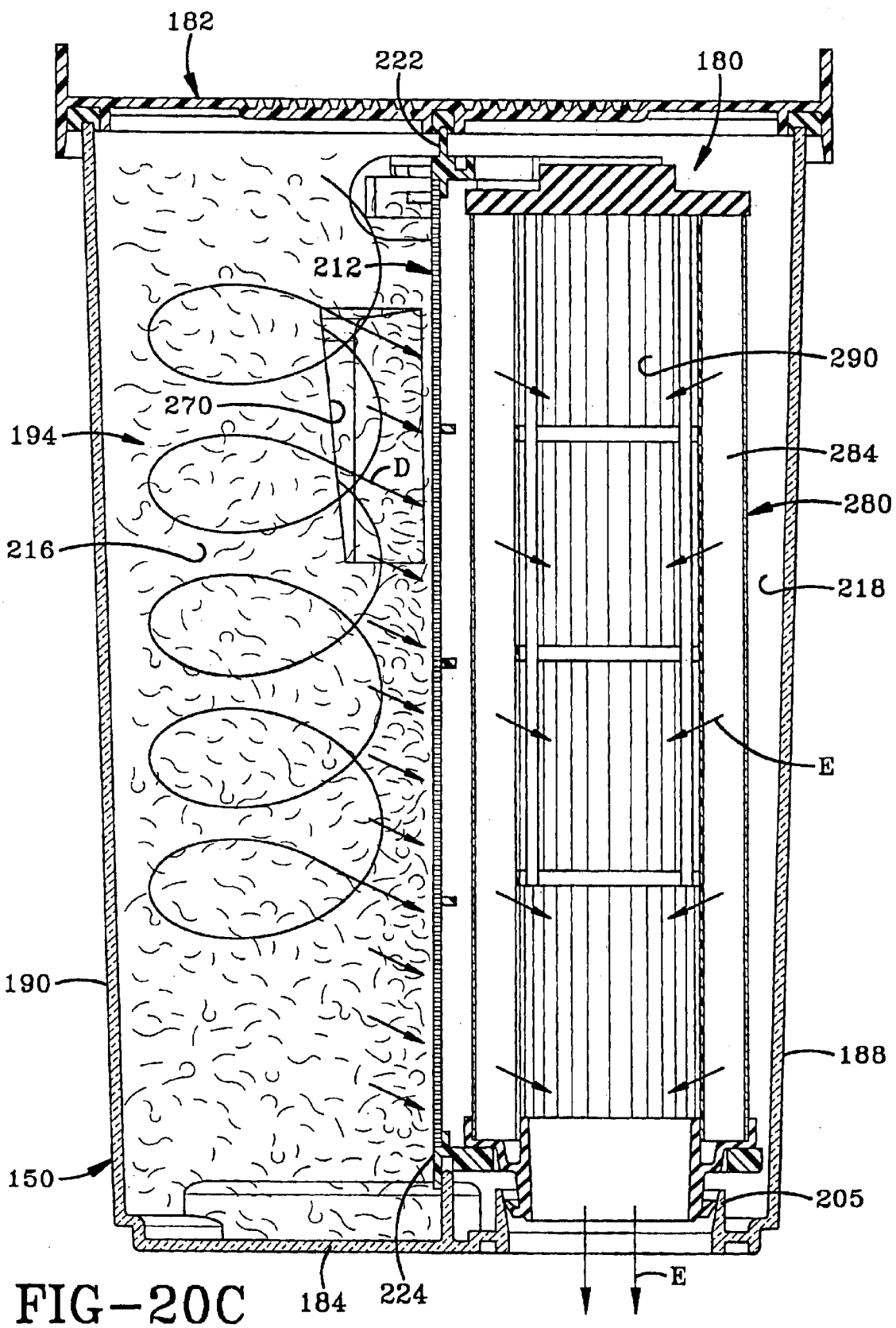
FIG. 20C is a sectional view similar to FIG. 20A showing a third stage of dirt accumulation within the dirt cup.

As the middle part of the apertured wall becomes partially clogged, the air stream will again seek the path of least resistance and least pressure, which has now been raised to an upper part of the apertured wall due to the partial clogging of the lower and middle parts of the apertured wall. Eventually, partial clogging will occur at the upper part of the apertured wall in a similar manner to that described for the lower and middle parts of the wall. The upper part of the wall performs the majority of the coarse particle separation which results in a build-up and partial clogging of the upper part of the wall. During extend periods of cleaning, the apertured wall will become substantially equally clogged from the bottom to the top thereof, as shown in FIG. 20C.

Figure 20D:
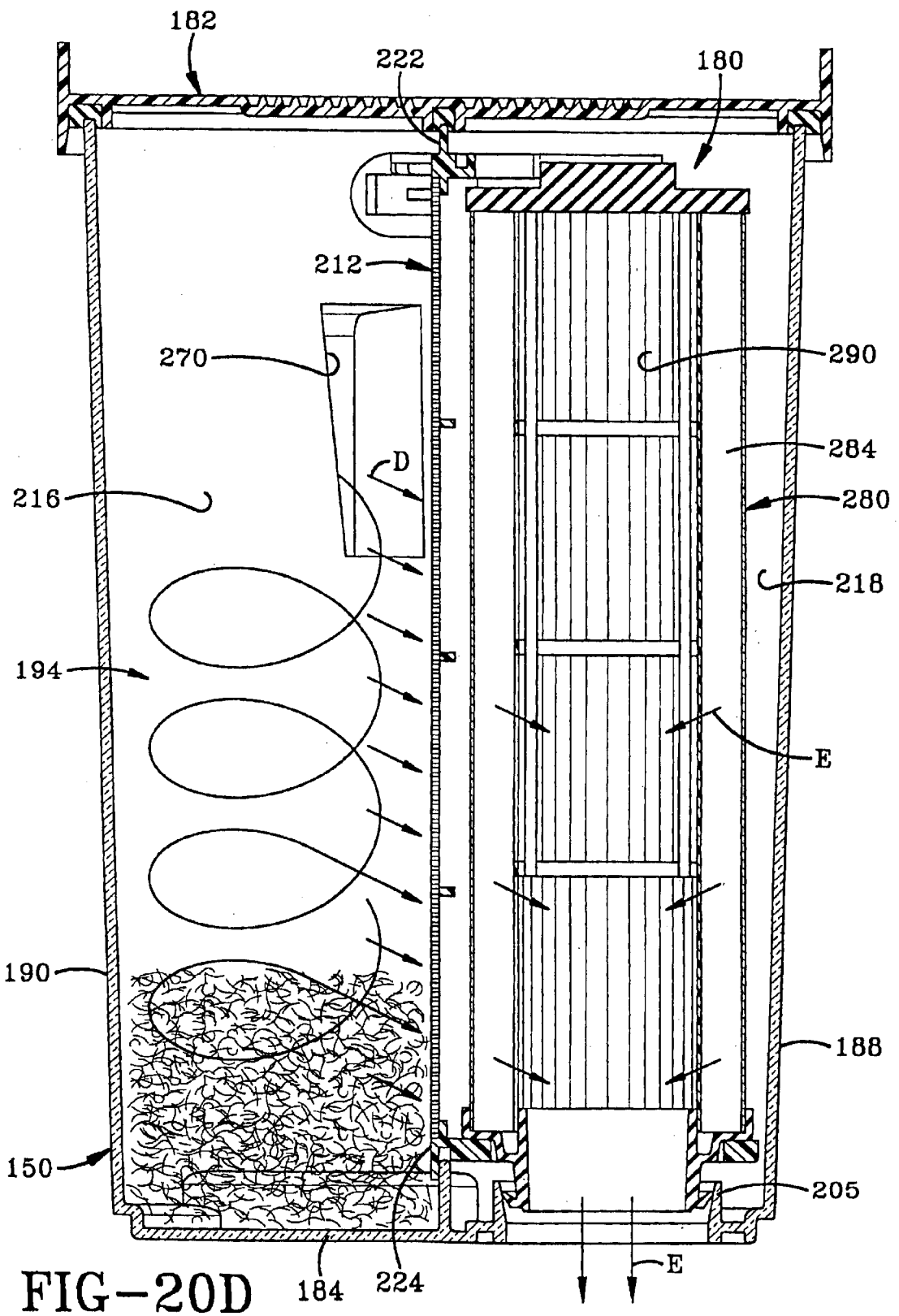
FIG. 20D is a sectional view similar to FIG. 20A showing a fourth stage of dirt accumulation within the dirt cup.

When the wall is substantially equally clogged from the bottom to the top thereof, the path of least resistance and least pressure will again exist in the lower portion of the dirt cup because of the substantially uniform partial clogging from the top to the bottom of the apertured wall, the high pressure created in the upper portion of the chamber by the higher location of the inlet opening, and the low pressure created in the lower portion of the chamber by the lower location of the exhaust port. This low pressure within the lower portion of the dirt cup causes a pressure drop from the top to the bottom of the first dirt collecting chamber. This pressure drop draws the air and dirt particles contained within the first dirt collecting chamber downwardly into the low pressure lower portion the first chamber causing a compaction of the dust, dirt and debris contained within the first chamber and within the air flowing within the first chamber. This compaction is shown is illustrated in FIG. 20D.

This compacting of the dirt within the first dirt collecting chamber allows additional quantities of dirt laden air to enter the dirt cup and substantially cleans the apertured wall, thus providing prolonged and sustained airflow through the dirt cup which, in turn, provides for longer continuous operation of the vacuum cleaner. The compacting effect occurs cyclically during use of the vacuum cleaner and takes place until the first dirt collecting chamber has been substantially filled with compacted dirt, dust and debris.

Because of the high negative pressure created at the exhaust port in vacuum cleaners having indirect air systems, the dirt is more tightly compacted in the bottom of the first dirt collecting chamber of an indirect air vacuum cleaner as compared to a direct air vacuum cleaner. Further, the highest point of negative pressure, namely the eye of the fan, is positioned adjacent to the exhaust port in indirect air systems, whereas direct air systems create a positive pressure within the dirt cup and position the eye of its fan upstream of and a substantial distance from the inlet opening 270. As a result, the pressure gradients within the dirt cup are believed to be greater in indirect air systems than in direct air systems. This higher pressure gradient across the lower portion of the apertured wall of an indirect air system create a stronger top to bottom pressure drop which results in a stronger downward pull on the debris in the first dirt collecting chamber in the clean air arrangement. Additionally, the anti-static additive in the dirt cup and apertured wall enhanced the compacting effect by preventing electro-static adhesion of the dirt particles to the dirt cup walls and apertured wall.

The present invention has been described above by way of example and includes an apertured wall 212 that extends substantially from the top to the bottom of the dirt cup 150 and a partition wall 210 extending upwardly from the bottom of the dirt cup to separate the dirt cup chamber 194 into a first dirt collecting chamber 216 and a second dirt collecting chamber 218. However, it will be appreciated that alternative arrangements may be employed to separate the large and heavy debris from the air stream without departing from the scope and spirit of the invention.

Figure 21A:
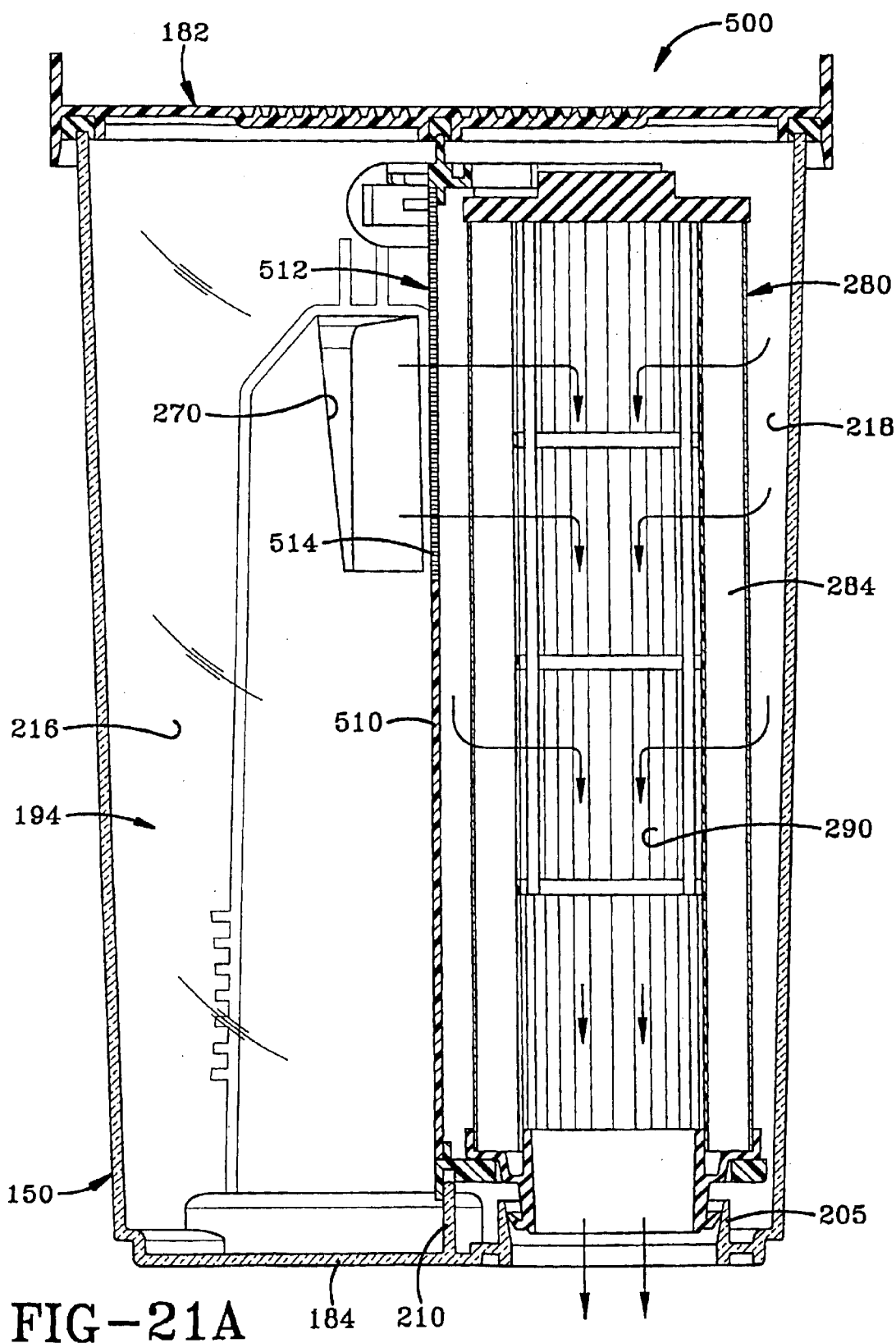
FIG. 21A is a sectional view showing a second embodiment of the dirt collecting system.

For example, FIG. 21A shows a second embodiment of a dirt collecting system 500 which includes a solid non-porous wall 510 extending upwardly from the bottom of the dirt cup. Wall 510 is similar to partition wall 210 of the first embodiment and extends substantially higher than partition wall 210. An apertured wall 512 similar to apertured wall 212 of the first embodiment extends between wall 510 and the top of the dirt cup. Apertured wall 512 is formed with one or more apertures 514 and is substantially shorter than apertured wall 212 of the first embodiment, thus requiring the air stream to flow from the first chamber to the second chamber at a top of the dirt cup. However, apertured wall 512 does extend at least partially adjacent to the inlet opening 270 to enable the apertured wall to be cleaned by the incoming air stream, as described above.

Figure 21B:
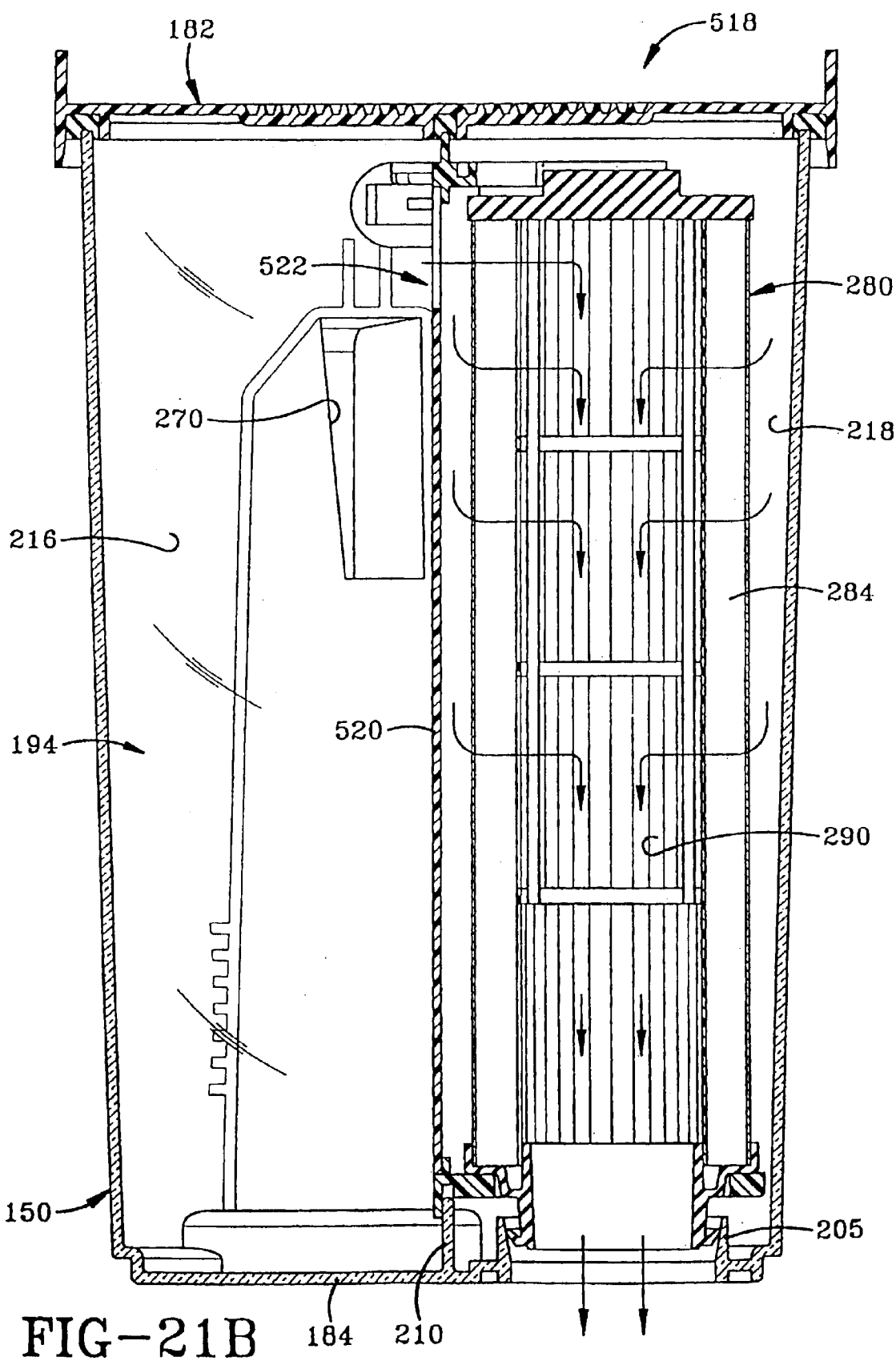
FIG. 21B is a sectional view showing a third embodiment of the dirt collecting system.

FIG. 21B shows a third embodiment of the dirt collecting system 518 which is similar to dirt collecting system 500 of the second embodiment. Dirt collecting system 518 includes a solid non-porous wall 520 extending upwardly from the bottom of the dirt cup. Wall 520 is similar to wall 510 of the second embodiment and extends higher than wall 510. A window 522 is formed above wall 520 creating an open area between wall 520 and the dirt cup lid. Wall 520 extends at least to a height above the top of the inlet opening 270 to located window 522 entirely above the inlet opening 270 as illustrated in FIG. 21B. The larger the area of the apertured wall 512 of dirt collecting system 500 and of the window

522 of the dirt collecting system 518, the better the sustained performance of the vacuum cleaner.

Figure 22:
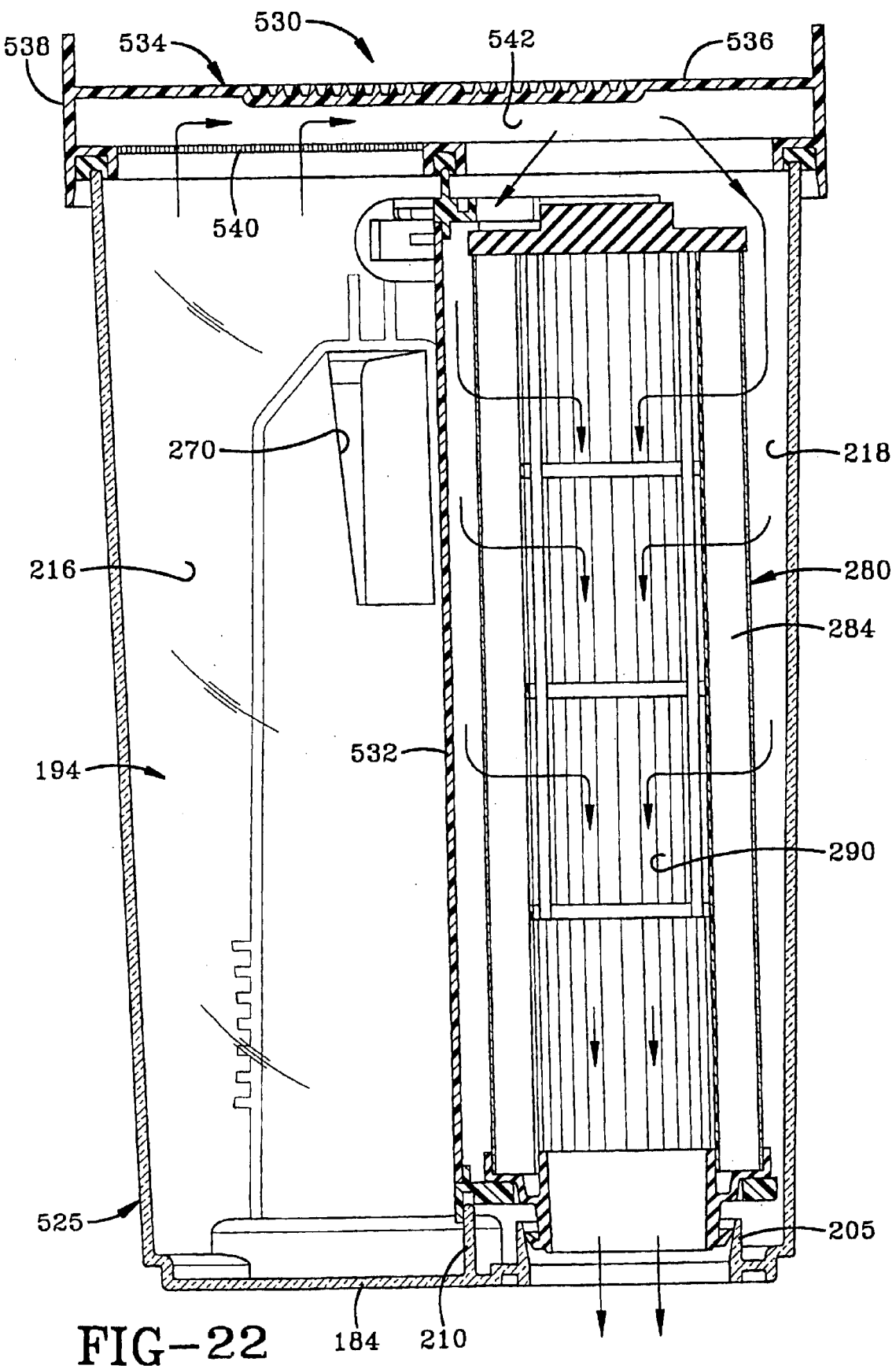
FIG. 22 is a sectional view showing a fourth embodiment of the dirt collecting system.

A fourth embodiment of the present dirt collecting system is illustrated in FIG. 22 and is indicated at 530. Dirt collecting system 530 includes a non-porous parting wall 532 extending between and separating first dirt collecting chamber 216 and second dirt collecting chamber 218. Dirt collecting system 530 further includes a dirt cup lid 534 having a top wall 536 spaced above the top of the dirt cup by a peripheral wall 538. An apertured wall 540, or other suitable coarse filter is located in the lid and extends above the first dirt collecting chamber 216. A passageway 542 is formed in dirt cup lid 534 which passes over the parting wall 532 to provide fluid communication between the first and second dirt collecting chambers.

Figure 23:
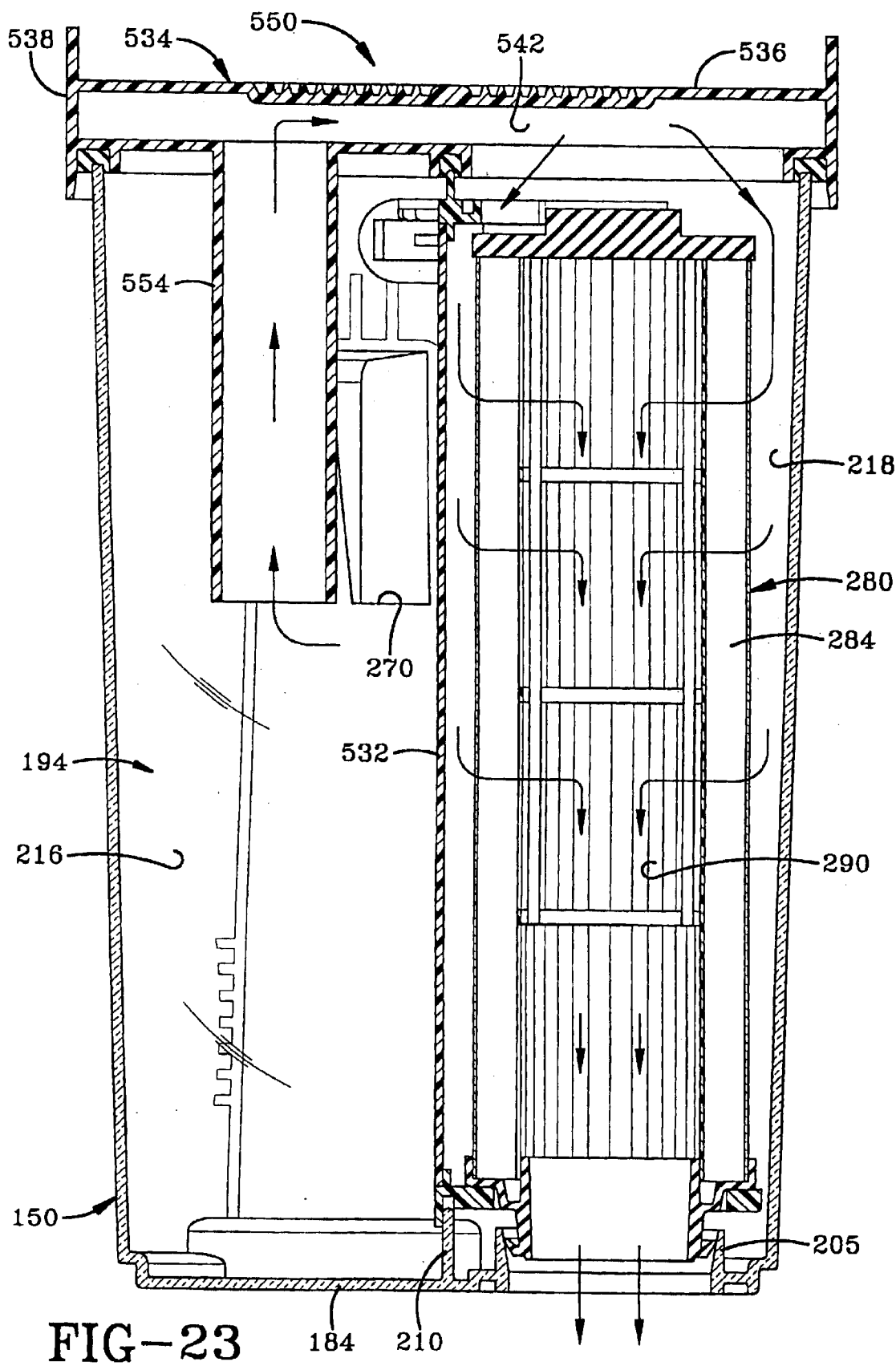
FIG. 23 is a sectional view showing a fifth embodiment of the dirt collecting system.

A fifth embodiment of the dirt collecting system is shown in FIG. 23 and is indicated at 550. Dirt collecting system 550 is generally similar to dirt collecting system 530 and includes a non-porous hollow cylindrical outlet tube 554 extending downwardly from dirt cup lid 534. Outlet tube 554 is positioned centrally in the first dirt collecting chamber 216. The inlet opening 270 is tangentially located in the annular space between the outlet tube 540 and the parting wall 532 whereby a cyclonic action is created in the top of the first dirt collecting chamber. The air exits the first dust collecting chamber through the outlet tube 540 and travels through the passageway 542 of the lid and into the second dirt collecting chamber.

The outlet tube 554 of dirt collecting chamber 550 may alternatively be formed with one or more apertures. In such an embodiment, the outlet tube 554 is formed entirely of a mesh or screen and includes a either a screen or non-porous bottom. The inlet opening 270 inputs the dirt-laden into the first dirt collecting chamber and is located in the annular space between the cylindrical apertured tube and the parting wall 532. As the incoming stream of dirt-laden air cyclonically swirls around the cylindrical apertured tube, the dirt particles contained within the air stream impinge upon the apertured tube to clean the peripheral surface thereof. An annular dust flange or disc (not shown) may extend radially outward from a bottom end of the apertured tube. The outer peripheral edge of the dust flange is spaced inward of the inner surface of the first dirt collecting chamber forming an annular space therebetween. Dirt and other debris is separated from the air by the cyclonic action and the force of gravity. The separated dirt falls through the annular gap into the lower portion of the first dirt collecting chamber. The dust flange may alternatively be located somewhere between the top and bottom ends of the cylindrical screen. In such an embodiment, the inlet opening 270 is formed entirely above the dust flange.

The present dirt collecting system may be contained within a single cylindrical dirt cup with the cylindrical filter member 280 being axially located therein (not shown). In this embodiment, the apertured wall may take the form of a cylindrical screen, or other suitable filtration material (not shown) concentrically located around the filter element. The cylindrical screen is spaced radially inwardly from the dirt cup to form a first annular space therebetween, and is spaced radially outwardly from the filter element to form a second annular space therebetween. The inlet opening 270 is tangentially located in the first annular space, which forms the first dirt collecting chamber. The cyclonic action created by the tangential input of the air stream along with the cylindrical screen function as a pre-filter or coarse particle separator to separate the large and heavy particles from the air stream. The air stream flows through the cylindrical screen and into the second annular space which forms the second dirt collecting chamber. The filter element functions as a primary filter or fine particle separator to separate the small dirt particles from the air stream. The air stream flows through the filter element and out the exhaust port 205.

The invention has been described above by way of example in a vertical orientation, i.e. with the dust collecting chambers and the filter member extending vertically. The dirt cup may be oriented horizontally whereby the dirt cup is turned ninety degrees and is positioned on its side. Such an arrangement may be found to be more suitable for a canister type vacuum cleaner. In such a horizontal orientation, the first dirt collecting chamber is preferably located below the second dirt collecting chamber, whereby gravity will assist in separation of dirt from the air as the air travels upward from the first dust collection chamber into the second dust collection chamber. However, it will be appreciated that other horizontal orientations of the previously described dirt cup may be employed. For example, the first and second dirt collecting chambers my be located horizontally side by side, as in the vertical arrangement.

It will be appreciated that the previously described dirt cups may be free of a dirt cup lid with the open top of the dirt cup sealing against the vacuum cleaner housing. In such an arrangement, the latching mechanism is located on the dirt cup housing support below the dirt cup. The latching mechanism presses upward on the bottom of the dirt cup pressing the open top of the dirt cup against the top handle cover 138 forming a seal therebetween. Alternatively, the bottom of the dirt cup and the dirt cup housing support may include complementary inclined surfaces. The operator inserts the dirt cup horizontally into the front cavity with the inclined surfaces camming the dirt cup upwardly to seal the top of the cup against the top handle cover 138. Similarly, the top of the dirt cup and the top handle cover may be inclined, whereby the operator presses the dirt cup into the front cavity and the inclined top of the cup is pressed against the inclined top handle cover forming a seal therebetween. Yet another alternative is to provide a dirt cup cover that is vertically movably mounted to the top handle cover. A latching mechaism, as previously described, may be used to press the dirt cup cover down onto the top of the dirt cup forming a seal therebetween.

Accordingly, the improved dirt collecting system for a vacuum cleaner is simplified, provides an effective, inexpensive, and efficient device which achieves all of the enumerated objectives. While there has been shown and described herein several embodiments of the present invention, it should be readily apparent to persons skilled in the art that numerous modifications may be made therein without departing from the true spirit and scope of the invention. Accordingly, it is intended by the appended claims to cover all modifications which come within the spirit and scope of the invention.

What is claimed is:

1. A bagless vacuum cleaner, comprising:
   a foot having a nozzle opening defined therein;
   a housing (i) pivotally connected to the foot and (ii) having a dirt cup support defining a top surface;
   an outlet opening defined in the top surface of the dirt cup support;
   a motor/fan assembly positioned in the housing;
   a duct opening adjacent to the top surface of the dirt cup support and in fluid communication with the nozzle opening;
   a removable dirt cup having (i) an upper edge and (ii) a bottom wall with an exhaust port defined therethrough;

a lid adapted to seal against a top edge of the dirt cup;

a dirt duct secured to the dirt cup having a first end in fluid communication an upper portion of the dirt cup and a second end proximate to the bottom wall of the dirt cup; and a filter positioned in the dirt cup to filter a stream of dirt-laden air prior to the stream exiting the exhaust port, wherein positioning the dirt cup on the dirt cup support (i) places the exhaust port of the dirt cup in fluid communication with the outlet opening, (ii) places the second end of the dirt duct in fluid communication with the duct opening, and (iii) allows the motor/fan assembly to move the stream of dirt laden air from the nozzle opening to outlet opening via the duct opening, dirt duct, filter member, and exhaust port.

2. The apparatus of claim 1, wherein the dirt duct is positioned on the leading edge of the dirt cup as the dirt cup is moved toward the dirt cup support.

3. The apparatus of claim 1, further comprising a handle, wherein the handled is positioned on the trailing edge of the dirt cup as the dirt cup is moved toward the dirt cup support.

4. The apparatus of claim 1, wherein the duct opening is positioned above the top surface of the dirt cup support.

5. The apparatus of claim 1, wherein the duct opening has a beveled edge which is angled upwardly and away from the top surface.

6. The apparatus of claim 5, wherein:

the second end of the dirt duct has a beveled edge which is angled upwardly and away from the bottom wall of the dirt cup, and the beveled edge of the second end of dirt duct is aligned with the beveled edge of the duct opening as the dirt cup is positioned on the dirt cup support.

7. The apparatus of claim 1, wherein the dirt duct is an integrally formed component of the dirt cup.

8. The apparatus of claim 1, further comprising a latch member secured to the housing which engages the lid.

9. The apparatus of claim 8, wherein the engaging the latch member with the lid (i) seals the second end of the dirt duct with the duct opening, and (ii) seals the exhaust port of the dirt cup with the outlet opening of the dirt cup support.

10. The apparatus of claim 1, wherein the filter material comprises a layer of expanded polytetrafluoroethylene (ePTFE).

11. A method of operating a bagless vacuum cleaner, comprising the steps of:

securing a dirt duct to a dirt cup;

positioning a dirt cup on a dirt cup support;

placing an exhaust port of the dirt cup in fluid communication with an outlet opening defined in the dirt cup support during the positioning step;

placing a second end of the dirt duct in fluid communicaiton with a duct opening located adjacent to the dirt cup support during the positioning step;

operating a motor/fan assembly to move a stream of dirt laden air from a nozzle opening, through a the dirt duct, into an upper portion of the dirt cup and through a filter member positioned in the dirt cup; and collecting dirt particles in the dirt cup in response to moving the stream of dirt laden air through the filter member during the operating step.

12. The method of claim 11, further comprising the step of positioning the dirt duct on the leading edge of the dirt cup during the positioning step.

13. The method of claim 11, further comprising the step of positioning a handle on the trailing edge of the dirt cup during the positioning step.

14. The method of claim 11, wherein the securing step further includes the step of integrally forming the dirt duct with the dirt cup.

15. The method of claim 11, wherein the placing a second end of the dirt duct step further includes the step of aligning a beveled edge of the duct opening with a beveled edge of the second end of the dirt cup.

16. The method of claim 11, wherein the positioning step further includes the step of engaging a latch member to a lid which seals an upper opening of the dirt cup.

17. The method of claim 16, wherein the engaging step further includes the steps of:

sealing the second end of the dirt duct to the duct opening; and sealing the exhaust port of the dirt cup with the outlet opening of the dirt cup support.

18. The method of claim 11, wherein the operating step further includes the step of passing the dirt laden air steam through a layer of expanded polytetrafluoroethylene (ePTFE).

19. A bagless vacuum cleaner, comprising:

a nozzle;

a duct opening in a housing which is in fluid communication with the nozzle;

a removable dirt cup;

a dirt duct integrally formed in an outer portion of the dirt cup;

a motor/fan assembly positioned in the housing;

a filter positioned in the dirt cup to filter a stream of dirt-laden air prior to the stream exiting the dirt cup;

wherein positioning the dirt cup in the housing (i) places a first end of the dirt duct in fluid communication with a dirt separation chamber at least partially defined by the dirt cup (ii) places a second end of the dirt duct in fluid communication with the duct opening, and (iii) allows the motor/fan assembly to move the stream of dirt laden air from the nozzle to the filter.

20. The apparatus of claim 19, wherein the filter comprises a layer of expanded polytetrafluoroethylene (ePTFE).

* * * * *